US012679747B2

(12) United States Patent  
Bae et al.

(10) Patent No.: US 12,679,747 B2  
(45) Date of Patent: Jul. 14, 2026

(54) WATER PURIFIER

(71) Applicant: LG Electronics Inc., Seoul (KR)

(72) Inventors: Jungsuk Bae, Seoul (KR); Jewook Jeon, Seoul (KR); Jongwon Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 706 days.

(21) Appl. No.: 17/836,421

(22) Filed: Jun. 9, 2022

(65) Prior Publication Data

US 2022/0396500 A1 Dec. 15, 2022

(30) Foreign Application Priority Data

Jun. 9, 2021 (KR) ........................ 10-2021-0075081

(51) Int. Cl.  
*C02F 1/00* (2023.01)  
*B67D 1/08* (2006.01)

(52) U.S. Cl.  
CPC ............ *C02F 1/003* (2013.01); *B67D 1/0895* (2013.01); *B67D 2210/0001* (2013.01); *C02F 2201/005* (2013.01); *C02F 2201/006* (2013.01)

(58) Field of Classification Search  
CPC ................ C02F 1/003; C02F 2201/005; C02F 2201/006; C02F 1/001; C02F 1/4672; (Continued)

(56) References Cited

U.S. PATENT DOCUMENTS 7,387,725 B2 * 6/2008 Choi ...................... B01D 61/20  
                                                285/308  
2001/0004962 A1 * 6/2001 Hirota ................... C02F 1/4674  
                                             204/228.1

(Continued)

FOREIGN PATENT DOCUMENTS

CN          102397009 A  *  4/2012  
KR      20070083008      8/2007

(Continued)

OTHER PUBLICATIONS

Food and Bioproducts Processing, vol. 99, Jul. 2016, pp. 71-77 ('Ameur') (Year: 2016).*

(Continued)

*Primary Examiner* — Patrick Orme  
*Assistant Examiner* — Boi-Lien Thi Nguyen  
(74) *Attorney, Agent, or Firm* — Fish & Richardson P.C.

(57) ABSTRACT

A water purifier includes a body part generating purified water, hot water, and sterilization water. The body part includes: a filter purifying water, a hot water module that defines a heating flow path through which the purified water passing through the filter passes and that heats the purified water passing through the heating flow path into hot water, an intermediate flow path connecting the filter to the hot water module, a sterilization water flow path having a first side branched from the intermediate flow path and a second side connected to a water outlet, a sterilization water module installed in the sterilization water flow path and electrolyzing water passing through the sterilization water flow path into sterilization water, a hot water flow path guiding the hot water passing through the hot water module toward a water discharge nozzle, and a controller controlling the hot water and sterilization modules.

18 Claims, 18 Drawing Sheets

(58) Field of Classification Search

CPC ...... C02F 2209/005; C02F 1/006; C02F 9/20; C02F 2307/10; C02F 2201/004; B67D 1/0895; B67D 2210/0001; B67D 1/0878; B67D 1/07; B67D 1/0857; B67D 1/1202; B67D 2001/075; B67D 2210/00031; B67D 2210/00047; B67D 2210/00163

See application file for complete search history.

(56) References Cited

U.S. PATENT DOCUMENTS

| | | | | |
|---|---|---|---|---|
| 2010/0242497 A1* | 9/2010 | Bertone | ............... | B67D 1/0894 62/344 |
| 2011/0303543 A1* | 12/2011 | Fritze | ................... | C02F 1/4691 204/554 |
| 2014/0305316 A1* | 10/2014 | Sevcik | ................ | B67D 1/0025 99/323.2 |
| 2017/0335064 A1 | 11/2017 | Stapleton et al. | | |
| 2018/0056217 A1* | 3/2018 | Park | ....................... | B01F 27/81 |

| | | | | |
|---|---|---|---|---|
| 2019/0359499 A1* | 11/2019 | Meier | ..................... | C02F 1/444 |
| 2020/0270116 A1* | 8/2020 | Jeon | ........................ | E03C 1/055 |
| 2020/0330629 A1* | 10/2020 | Massey | .................. | C02F 1/008 |

FOREIGN PATENT DOCUMENTS

| | | | | | |
|---|---|---|---|---|---|
| KR | 10-2016-0099279 A | † | 8/2016 | | |
| KR | 1020160099279 | * | 8/2016 | .......... | B01D 35/306 |
| KR | 10-2017-0088792 A | † | 8/2017 | | |
| KR | 10-2018-0022062 A | | 3/2018 | | |
| KR | 20190010596 | | 1/2019 | | |
| KR | 10-2020-0132601 A | | 11/2020 | | |

OTHER PUBLICATIONS

Machine Translation of KR KR1020160099279 ('Kim') (Year: 2016).*

PlugTail Connectors (Year: 2017).*

Office Action in Korean Appln. No. 10-2021-0075081, mailed on Feb. 25, 2026, 13 pages (with English translation).

* cited by examiner

† cited by third party

| Amount of Coolant | | 1.10L | | | | | | | |
|---|---|---|---|---|---|---|---|---|---|
| Evaporator | | Ø6.35 x 3Turn | | | | | | | |
| Cooling coil | Type | Dual Coil(Internal 13 turns + External 8 turns) | | | | | | | |
| | Spec. | Ø6.35 x 0.4t x 4,947mm(119.7cc) | | | | | | | |
| Agitator | Blade | ATOM Blade | Change ATOM Blade | | Blade including Base | | Dual Blade Case 1 | | Dual Blade Case 2 |
| | | CCW 15° | CW 15° | | CCW 15° | | CCW 0° | | CCW 15° |
| Time of discharging cold water | | Comp. On | Comp. On | Comp. Off | Comp. On | Comp. Off | Comp. On | Comp. Off | Comp. On | Comp. Off |
| Cold water discharging Temperature (°C) | 1 glass | 6.3 | 6.1 | 5.5 | 6.4 | 5.1 | 6.1 | 5.6 | 5.9 | 5.2 |
| | 2 glasses | 6.1 | 5.8 | 5.2 | 6.2 | 5.5 | 6.2 | 5.5 | 5.8 | 5.3 |
| | 3 glasses | 7.1 | 7.1 | 6.7 | 7.2 | 6.8 | 7.5 | 7.2 | 6.8 | 6.5 |
| | 4 glasses | 7.6 | 7.9 | 7.6 | 7.8 | 7.7 | 8.3 | 8.5 | 7.5 | 7.4 |
| | 5 glasses | 8.1 | 8.4 | 8.3 | 8.4 | 8.1 | 8.8 | 9.0 | 7.9 | 7.9 |
| | 6 glasses | 8.7 | 9.0 | 8.7 | 8.9 | 8.7 | 9.3 | 9.5 | 8.3 | 8.4 |
| | 7 glasses | 9.5 | 9.4 | 9.2 | 9.9 | 9.0 | 9.7 | 10.1 | 8.6 | 8.7 |
| Average discharging temperature of 6 glasses(°C) | | 7.3 | 7.4 | 7.0 | 7.5 | 7.0 | 7.7 | 7.6 | 7.0 | 6.8 |

WATER PURIFIER

CROSS-REFERENCE TO RELATED APPLICATIONS

This application claims priority under 35 U.S.C. 119 and 365 to Korean Patent Application No. 10-2021-0075081, filed on Jun. 9, 2021 in the Korean Intellectual Property Office, the disclosure of which is incorporated herein by reference.

FIELD

The present disclosure relates to a water purifier.

BACKGROUND

In general, a water purifier is a device that filters raw water to a user and supplies the filtered water to the user, and is a device that allows the user to take out a desired amount of water at a desired temperature according to user manipulation.

Generally, in such a water purifier, water filtered through a nozzle is taken out when the user manipulates a lever or a button. In detail, the water purifier is configured to open a valve of the nozzle and to take out filtered water while the user manipulates the lever or the button, and the user terminates manipulation of the lever or the button while checking the amount of water filled in a cup or a container.

Such a water purifier may be provided as a water purifier itself, or may be mounted on a refrigerator or the like.

The cited reference 1 (Korean Patent Publication No. 2019-0010596) discloses a water purifier including a case having a storage space, a filter provided inside the case to purify water supplied from a water supply source, a water supply flow path for supplying water supplied from the filter to the filter to the filter, a water supply valve provided on the water supply flow path to control flow of water passing through the water supply flow path, a water discharge nozzle that is provided outside the case and through which water passing through the filter is taken out, a water discharge flow path for supplying water passing through the filter to the outside of the case, a water discharge valve provided on the water discharge flow path to control flow of water passing through the water discharge flow path, a manipulator configured to receive a washing command from a user, and a controller configured to control at least one of the water supply valve and the water discharge valve to be intermittently opened or closed in response to the washing command being input to the manipulator.

In addition, the cited reference 2 (Korean Patent Application Laid-Open No. 2007-0083008) discloses a direct storage device employing an RO membrane module. The disclosed direct purified water device includes a purified water storage tank for temporarily storing the purified water, a first connector pipe providing a flow path to supply the purified water flowing through the purified water discharge pipe to the purified water storage tank, a second connection pipe for providing a flow path for purified water stored in the storage tank to flow into the RO membrane module, a booster pump installed in the path of the raw water supply pipe to increase the supply pressure of raw water, and a controller configured to perform control, when a faucet is locked, to detect this, to supply the purified water discharged from the purified water discharge pipe to the purified water storage tank, and to supply the stored purified water to the RO membrane module when a predetermined amount of purified water is stored in the purified water storage tank.

In the case of the above-described conventional water purifier, in order to discharge purified water, a 'water out' button is pressed after a 'purified water' button is selected, a purified water valve is opened, purified water flows through a purified water flow path, and the purified water is discharged through a water discharge nozzle.

In the case of the above-described conventional water purifier, in order to discharge hot water, a 'water out' button is pressed after a 'hot water' button is selected, a hot water valve is opened, hot water heated in a hot water tank flows through a hot water flow path, and the hot water is discharged through the hot water discharge nozzle.

That is, in the case of the conventional water purifier, the hot water flow path and the purified water flow path are formed separately, hot water is supplied to the water discharge nozzle through the hot water flow path and the hot water valve, and purified water is supplied to the water discharge nozzle through the purified water flow path and the purified water valve.

The above-described conventional water purifier providing cold water, purified water, and hot water discharge functions separately includes a cold water flow path, an intermediate flow path, and a hot water flow path. This is to distinguish flow paths of water with different temperatures. As such, it is taken for granted to have a structure in which flow paths are provided for each temperature of water to be discharged, but when each flow path is configured, complexity increases, space utilization is disadvantageous, and unit cost increases.

Conventionally, in order to check and replace a pipe or an electric wire inside a water purifier body, there is a hassle to separate an upper surface defining an outer appearance of the water purifier body, and there is a problem of poor workability.

Conventionally, as a cold water pipe in a cooling module is changed to a stainless material, cooling performance is degraded, and thus there is also a problem in that a cold water temperature is slowed down.

SUMMARY

An object of an embodiment of the present disclosure is to provide a water purifier for implementing a flow path to discharge hot water and purified water through a hot water flow path without a separate purified water flow path and purified water valve, thereby advantageously reducing the material cost corresponding to provision of the purified water flow path and the purified water valve.

An object of an embodiment of the present disclosure is to provide a water purifier for omitting the configuration of the purified water flow path and the purified water valve, thereby advantageously increasing space utilization inside the water purifier and miniaturizing the water purifier.

An object of an embodiment of the present disclosure is to provide a water purifier for forming a flow path of water flowing to a filter when hot water is discharged and purified water is discharged, and thus a discharged water flow rate of purified water may be advantageously ensured while satisfying a temperature condition of hot water.

An object of an embodiment of the present disclosure is to provide a water purifier for discharging residual water after hot water is discharged to prevent the temperature of discharged purified water from being increased by residual hot water during discharge of purified water after discharging hot water, thereby advantageously maintaining the state in which a temperature condition of the discharged purified water is satisfied.

An object of an embodiment of the present disclosure is to provide a water purifier for sterilizing the water discharge nozzle as well as the pipe and the valve that are disposed between the filter and the water discharge nozzle based on a flow direction of water with hot water by heating water flowing toward the filter and then supplying the heated water toward the filter.

An object of an embodiment of the present disclosure is to provide a water purifier for improving workability by separating and installing the sterilization water module without separating the water purifier body.

An object of an embodiment of the present disclosure is to provide a water purifier for improving space utilization by disposing the sterilization water module in an empty space inside the water purifier body.

An object of an embodiment of the present disclosure is to provide a water purifier for lowering an entire temperature of water in the coolant tank and lowering cold water discharged temperature because upper flow and lower flow occur inside the cold water module.

An object of an embodiment of the present disclosure is to provide a water purifier for improving workability by connecting the wires to the body part through a rear surface of the housing without separation of the top cover.

An object of an embodiment of the present disclosure is to provide a water purifier for improving assembly by connecting the wires to a rear surface of the housing in the state in which the housing is assembled.

An object of an embodiment of the present disclosure is to provide a water purifier for easily changing a shape of a pipe according to an environment in which the body part is installed because a direction in which the pipe extends is easily changed.

To achieve the object of the present disclosure, the present disclosure provides a water purifier including a body part for generating purified water, hot water, and sterilization water, and a water outlet disposed on an outside of the body part and discharging the purified water, the hot water, and the sterilization water generated by the body part.

The body part may include a housing defining a storage space, a filter provided inside the housing and configured to purify water supplied from an external water supply source, a hot water module defining a heating flow path through which the purified water passing through the filter passes and configured to instantaneously heat the purified water passing through the heating flow path into hot water when hot water is discharged, an intermediate flow path connecting the filter and the hot water module, a sterilization water flow path having one side branched from the intermediate flow path and another side connected to the water outlet, a sterilization water module installed in the sterilization water flow path and configured to electrolyze water passing through the sterilization water flow path into sterilization water, a hot water flow path configured to guide the hot water passing through the hot water module toward a water discharge nozzle, and a controller configured to control operations of the hot water module and the sterilization water module.

The body part may define an accommodation groove concave inwardly from an upper part of one side, the sterilization water module may be accommodated in the accommodation groove, and an accommodation groove cover configured to shield an open entrance of the accommodation groove may be detachably coupled to the body part.

The body part may define an upper surface part extending inwardly from an upper end of the entrance of the accommodation groove, and the accommodation groove cover may include an upper end part extending in a horizontal direction from the upper end to surface-contact the upper surface part, and a hook part formed at an end of the upper end part and fixed to an end of the upper surface part in a hook manner.

The body part may define a lower surface part extending inwardly from a lower end defining the entrance of the accommodation groove, and the accommodation groove cover may define a lower end part extending in a horizontal direction from the lower end and accommodated on an upper end of the lower surface part.

The housing may include a front cover defining a front surface, and the front cover may be detachably coupled to the body part.

The water purifier may further include a cold water flow path having one side branched from the intermediate flow path and another side connected to the water outlet, and a cold water module installed in the cold water flow path and configured to cool purified water passing through the cold water flow path into cold water.

The cold water module may include a coolant tank having a coolant stored therein, a tank cover configured to cover an open upper surface of the coolant tank, a stirring motor installed in the tank cover, and a stirring member including a shaft part inserted into the body part and connected to a rotating shaft of the stirring motor, and a blade part formed on each of a middle and a lower end of the shaft part and placed inside a pipe of the cold water.

The blade part may include a plurality of blades inclined to one side and arranged along a periphery of the shaft part.

The blade part may include an upper blade part formed on a middle part of the shaft part, and a lower blade part formed on a lower end of the shaft part.

Based on a vertical direction, a blade of the upper blade part may be inclined by a first angle, and a blade of the lower blade may be inclined by a second angle smaller than the first angle.

The housing may include a connector opened in a horizontal direction at an upper side and connecting an inside and an outside of the housing, and the connector may include a first connector having a first height, and a second connector having a second height lower than the first height and connected to one side of the first connector.

The water purifier may further include a connector cover that is inserted through the first connector and then shields the second connector.

The connector cover may define a slide groove, into which an upper end and a lower end that define the second connector are inserted, at upper and lower sides, and the connector cover is fixed to the second connector in a slide manner.

At least one through hole, through which a pipe or an electric wire passes, may be formed in the connector cover.

The plurality of through holes may be provided and may have different diameters.

The plurality of through holes may be provided and may be at least partially connected.

The connector cover may be formed of an elastic material.

The housing may include a connector opened in a horizontal direction at an upper side and connecting an inside and an outside of the housing, and a pipe extending outward inside the housing may pass through the connector.

The pipe may include a corrugated section formed to be corrugated along a longitudinal direction.

The corrugated sections may be formed at three points of the pipe, and the corrugated sections may be spaced apart from each other.

The pipe may be formed of a metallic material.

When the purified water is discharged, the controller may turn off the hot water module, and the purified water discharged from the hot water module may be discharged to the water outlet through the hot water flow path.

When the hot water is discharged, the controller may turn on the hot water module, and the hot water discharged from the hot water module may be discharged to the water discharge nozzle through the hot water flow path.

The water purifier may further include a hot and cold water valve mounted between the filter and the hot water module and configured to control flow of water flowing toward the hot water module, and when the hot water is discharged and the purified water is discharged, the controller may open the hot and cold water valve to allow water to flow toward the hot water module.

The water purifier may further include a water supply flow path configured to guide water supplied from the water supply source toward the filter, an auxiliary flow path that is branched from a first point of the water supply flow path and is then combined with a second point of the water supply flow path, which is positioned behind the first point based on a flow direction of water, a flow control valve installed in the auxiliary flow path, and a flow switching valve installed at the first point and configured to control flow of water flowing toward the auxiliary flow path in the water supply flow path, wherein the controller may control an operation of the flow switching valve.

The controller may control the flow switching valve to allow water of the water supply flow path to pass through the auxiliary flow path when hot water is discharged.

When purified water is discharged, the controller may control the flow switching valve to allow water of the water supply flow path to flow only through the water supply flow path.

An auxiliary heater configured to heat water flowing in the auxiliary flow path may be installed in the auxiliary flow path.

When hot water is sterilized, the controller may operate the auxiliary heater, and hot water heated while passing through the auxiliary heater may pass through the filter and may then flow in a direction toward the water discharge nozzle.

The body part may be installed in a lower space of a sink, and at least a portion of the water outlet may be exposed to an upper side of the sink.

BRIEF DESCRIPTION OF THE DRAWINGS

FIG. 4 is a perspective view of a body part of a water purifier, viewed from a front surface of the water purifier.

6

Figure 5:
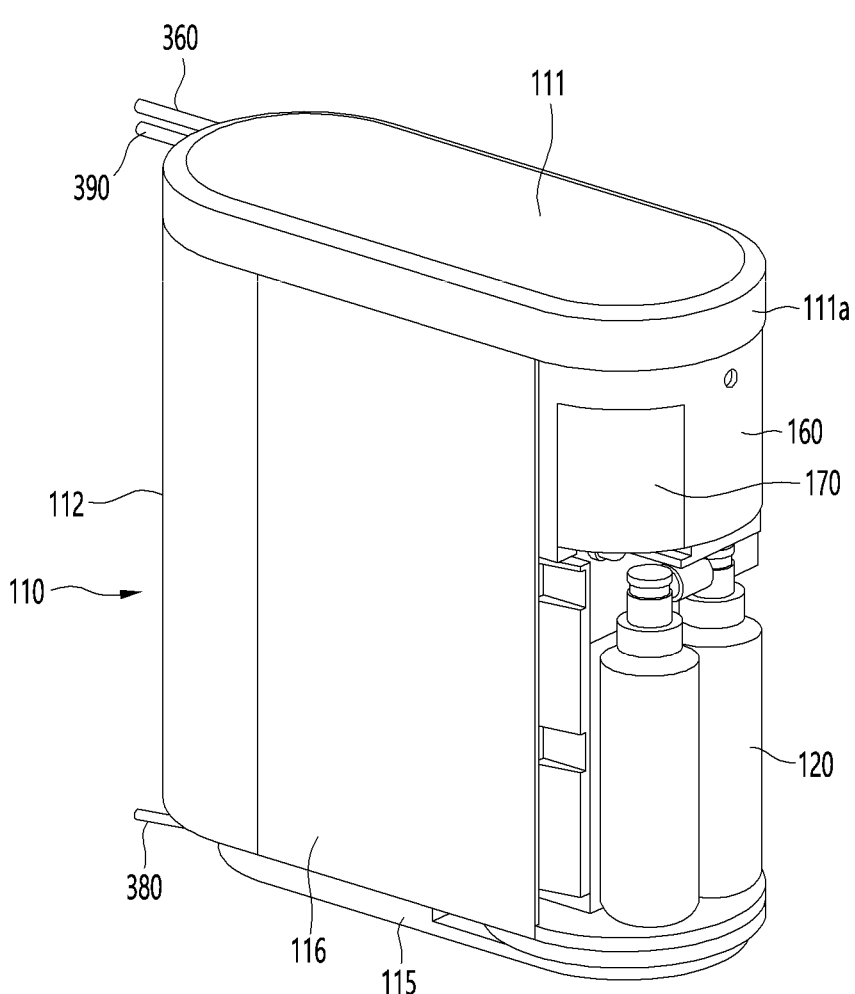
FIG. 5 is a diagram showing the state in which a front cover is separated from the front cover of FIG. 4.
Figure 6:
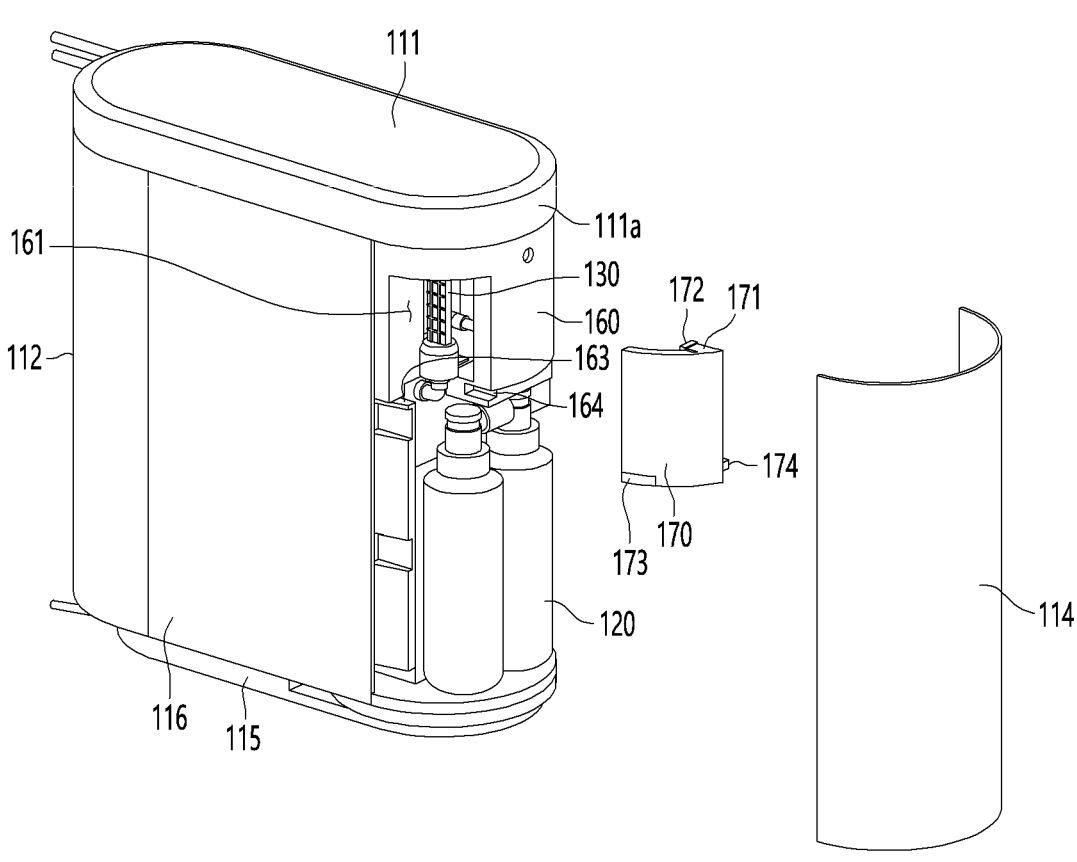

FIG. 6 is a diagram showing the state in which an accommodate ion groove cover is separated in FIG. 5.

Figure 7:
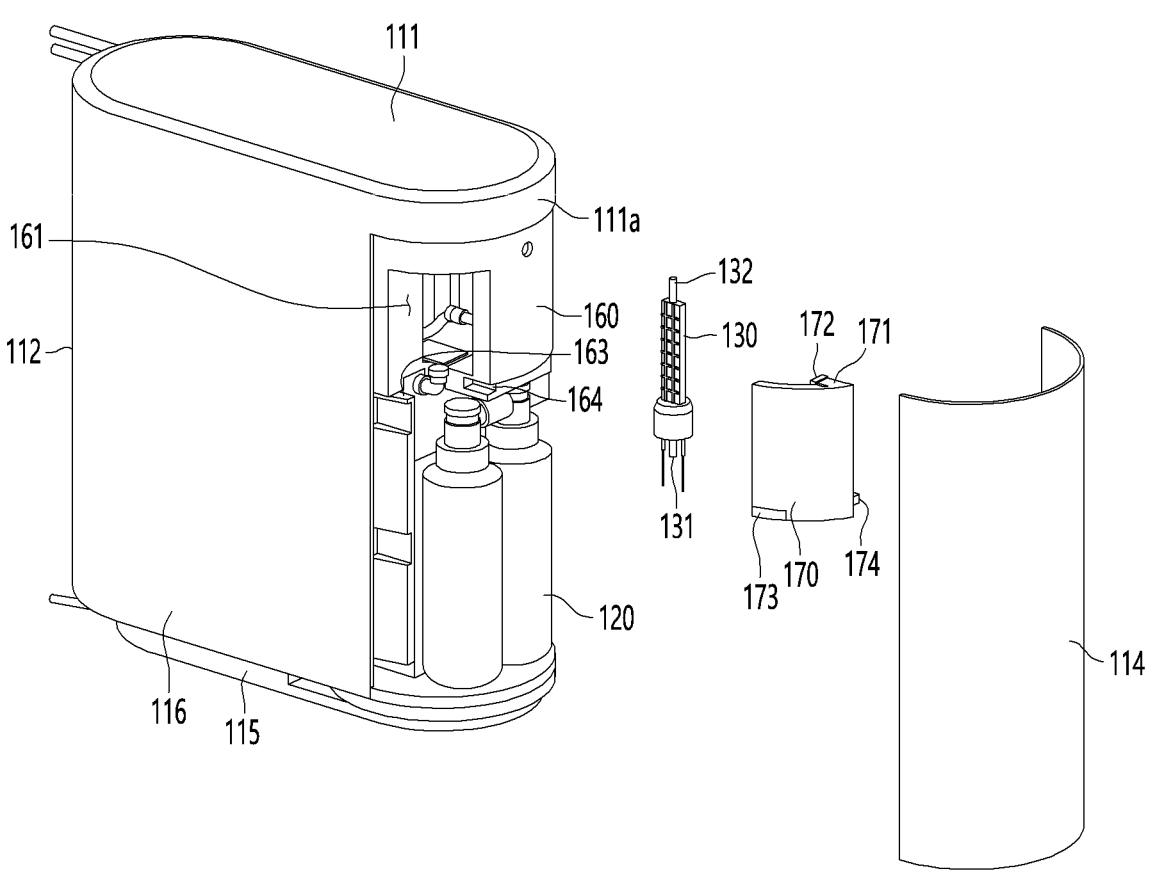

FIG. 7 is a diagram showing the state in which a sterilization water module is separated in FIG. 6.

Figure 8:
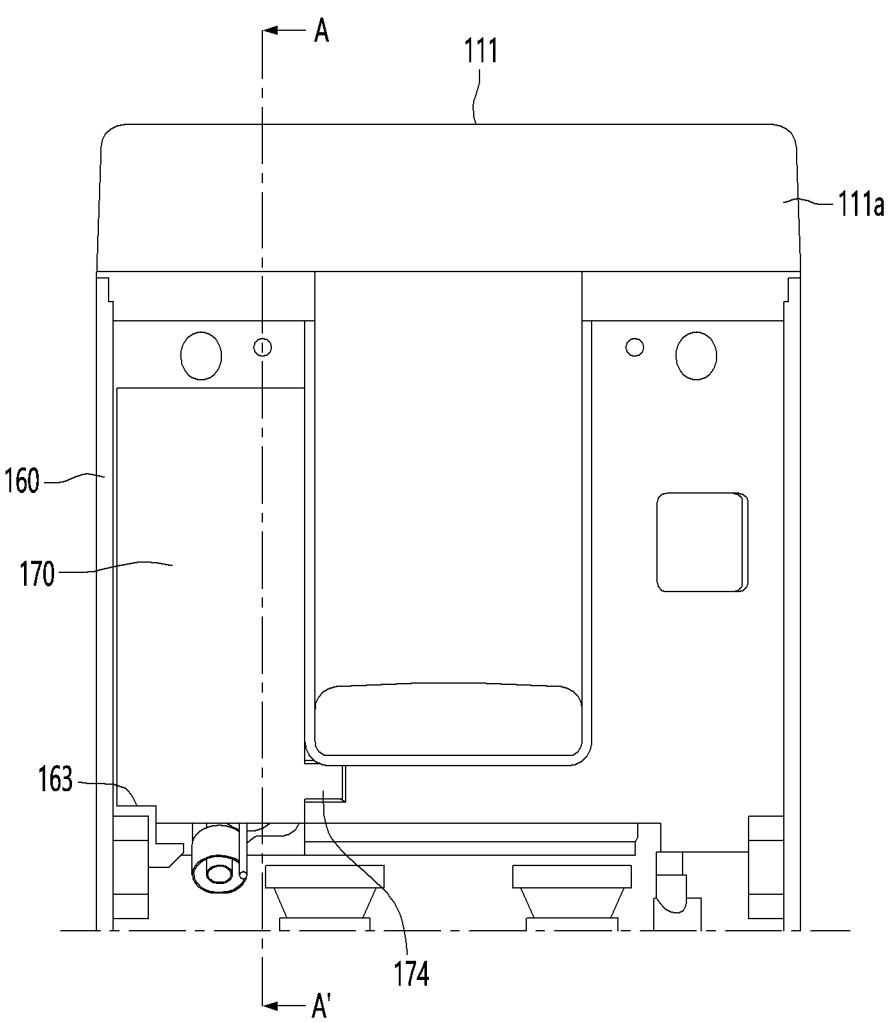

FIG. 8 is a diagram of a body part viewed from a front surface when a front cover is separated.

Figure 9:
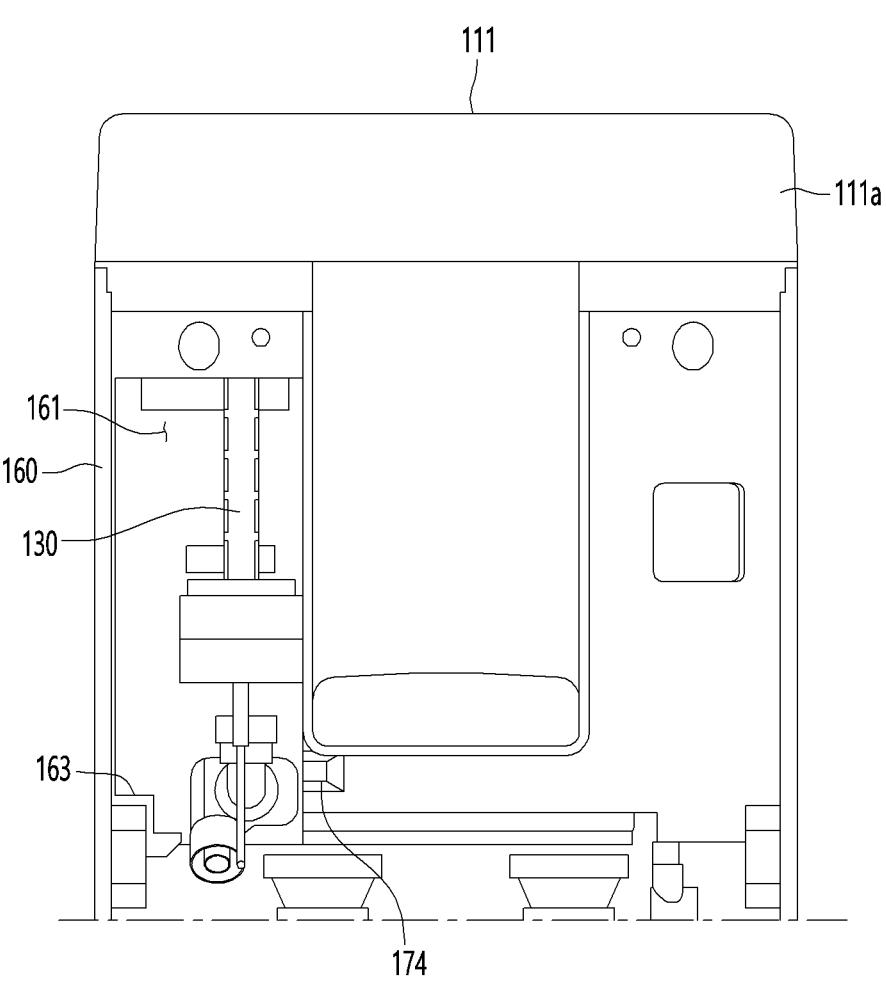

FIG. 9 is a diagram showing the state in which an accommodation groove cover is separated in FIG. 8.

Figure 10:
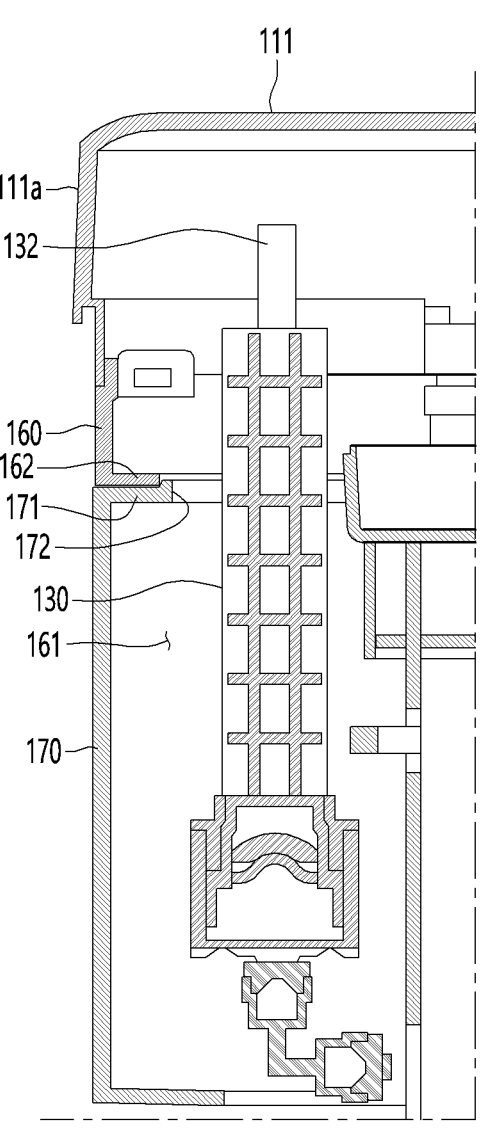

FIG. 10 is a cross-sectional view taken along A-A' of FIG. 8.

Figure 11:
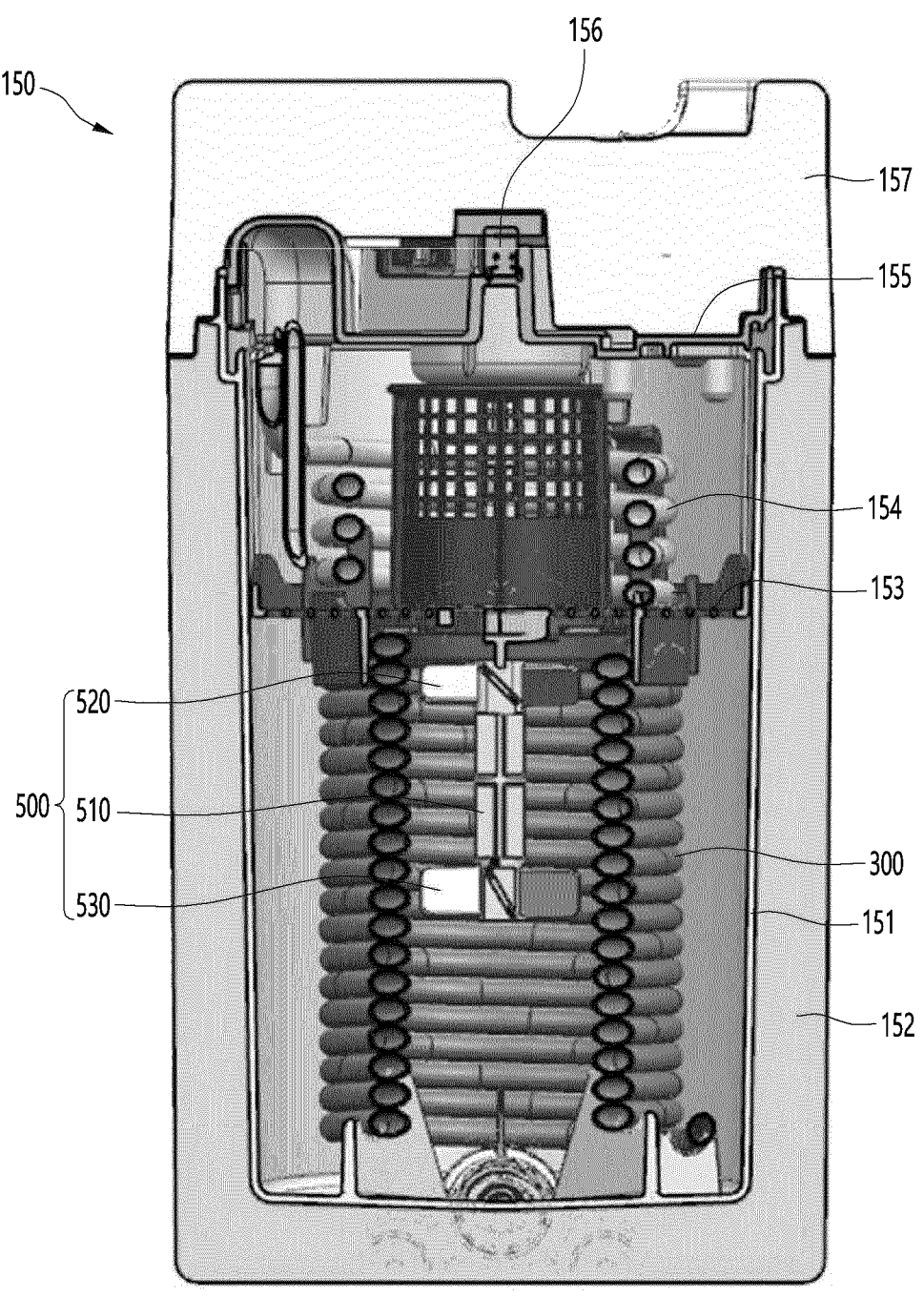

FIG. 11 is a perspective view of a stirring member applied to a cold water module according to the present disclosure.

Figure 12:
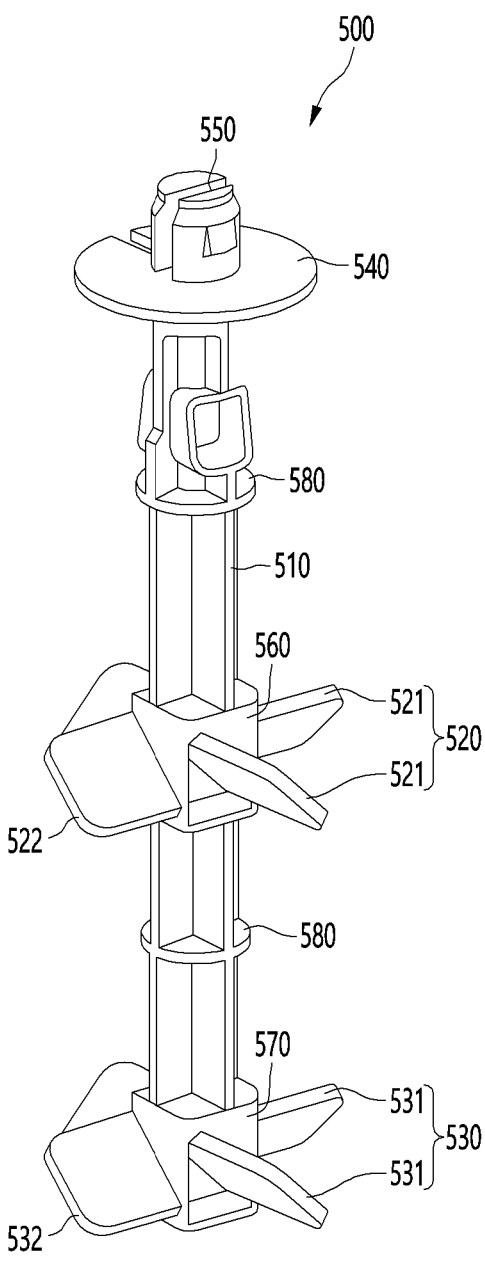

FIG. 12 is a cross-sectional view of a cold water module applied to a water purifier according to the present disclosure.

Figure 13:
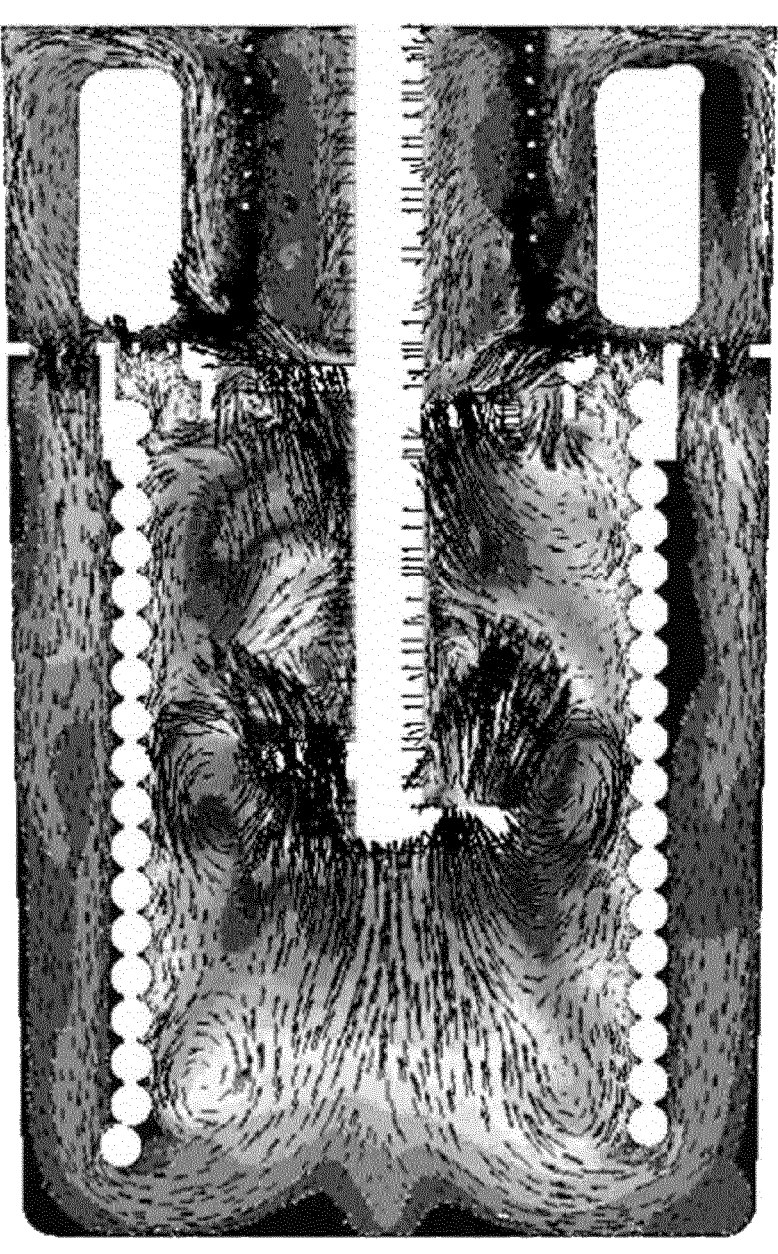

FIG. 13 is a diagram showing analysis of flow in a cold water module when a stirring member is operated according to the present disclosure.

Figure 15:
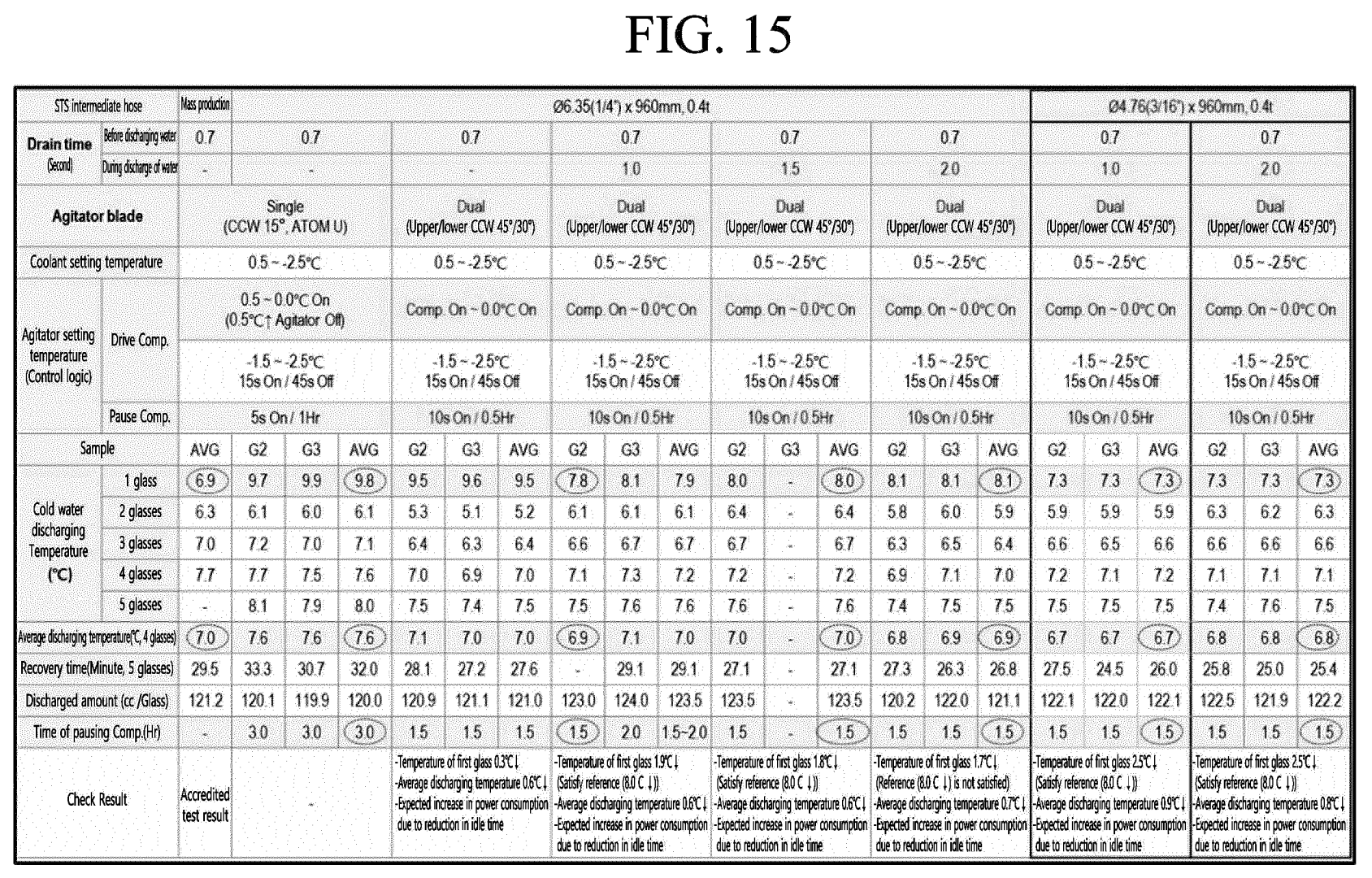

FIGS. 14 to 15 are tables showing comparison of cold water discharging temperature and cooling performance for each shape of a stirring member.

Figure 16:
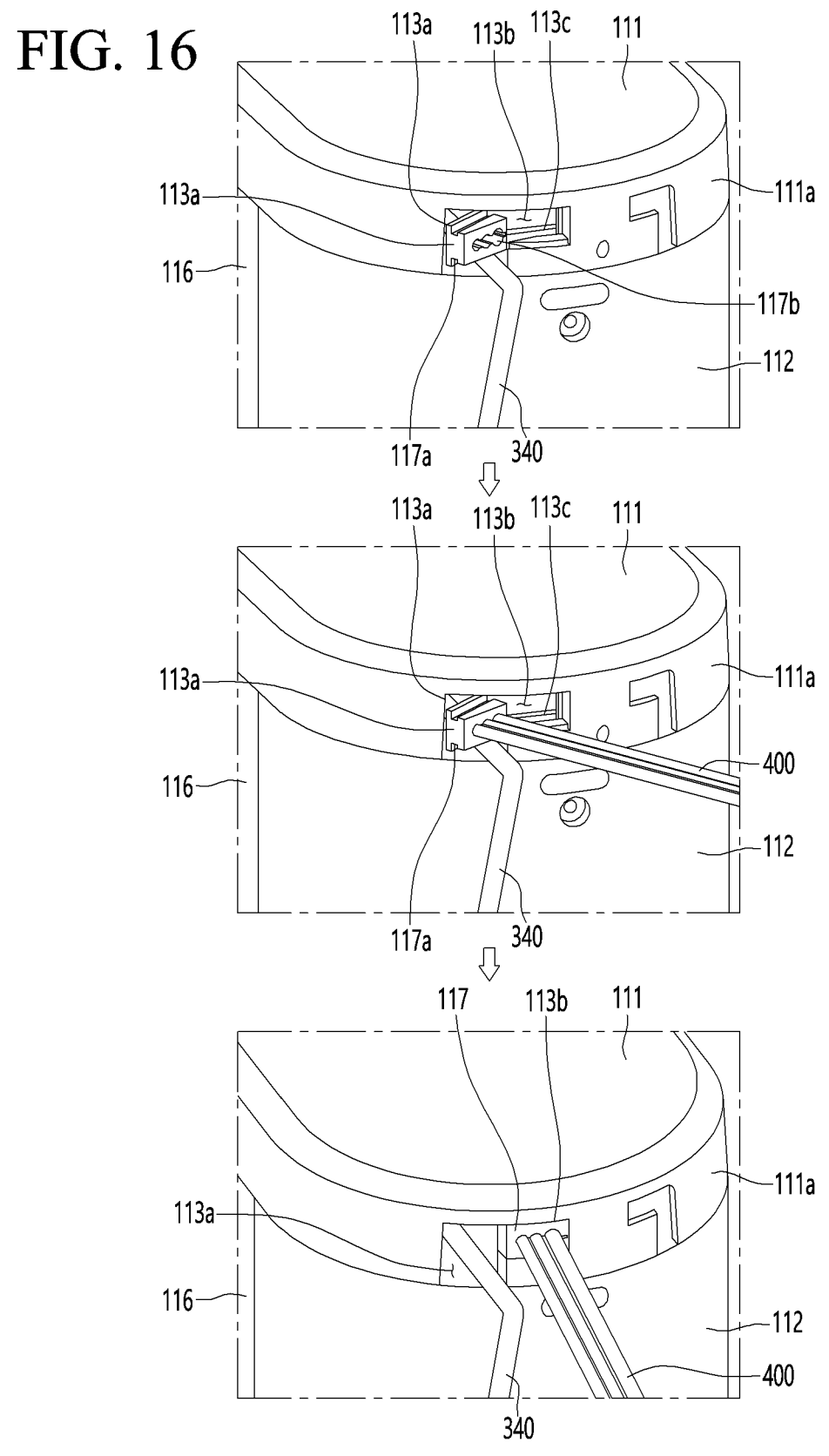

FIG. 16 is a diagram showing a procedure of connecting a flow path and a wire of a water purifier to a housing according to the present disclosure.

Figure 17:
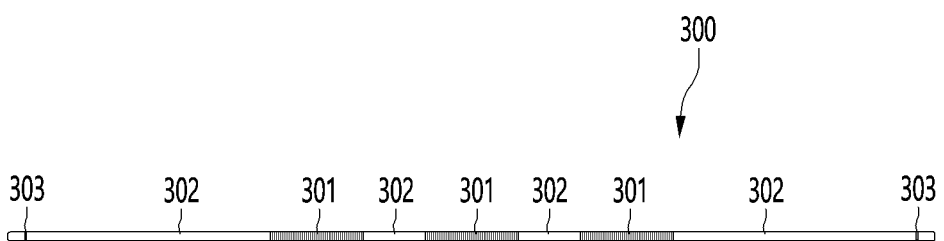

FIG. 17 is a diagram showing the state in which a pipe applied to a water purifier is straightened according to the present disclosure.

Figure 18:
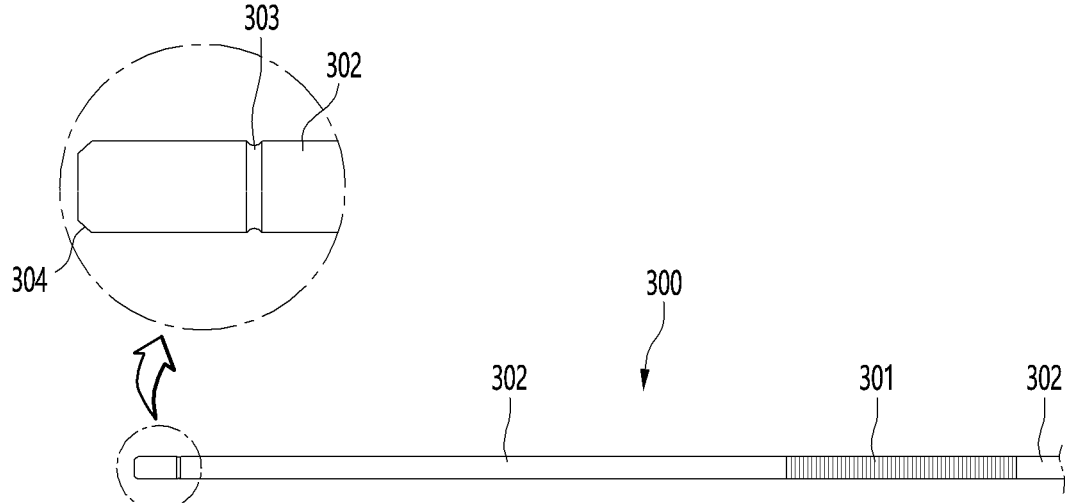

FIG. 18 is an enlarged view of a part of FIG. 17.

Figure 19:
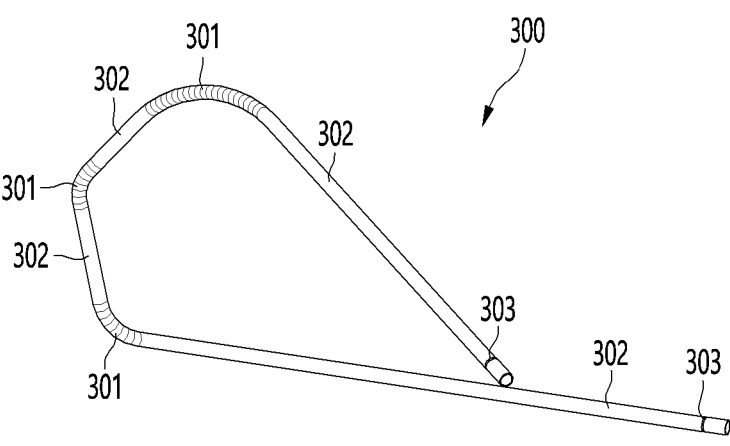

FIG. 19 is a diagram showing the state in which a pipe applied to a water purifier is bent according to the present disclosure.

DETAILED DESCRIPTION

Hereinafter, specific embodiments of the present disclosure will be described in detail with reference to the drawings. However, the spirit of the present disclosure is not limited to the embodiments presented below, and those skilled in the art who understand the spirit of the present disclosure may implement other embodiments included in the scope of the present disclosure by adding, changing, deleting, and adding components, but this will also be included within the scope of the present disclosure.

The drawings attached to the following embodiments may be expressed differently for each drawing in the expression of minute parts, and specific parts may not be displayed according to the drawings, or may be exaggerated according to the drawings in order to easily understand the idea of the present disclosure without the scope of the present disclosure.

<Under Sink Type Water Purifier>

Figure 1:
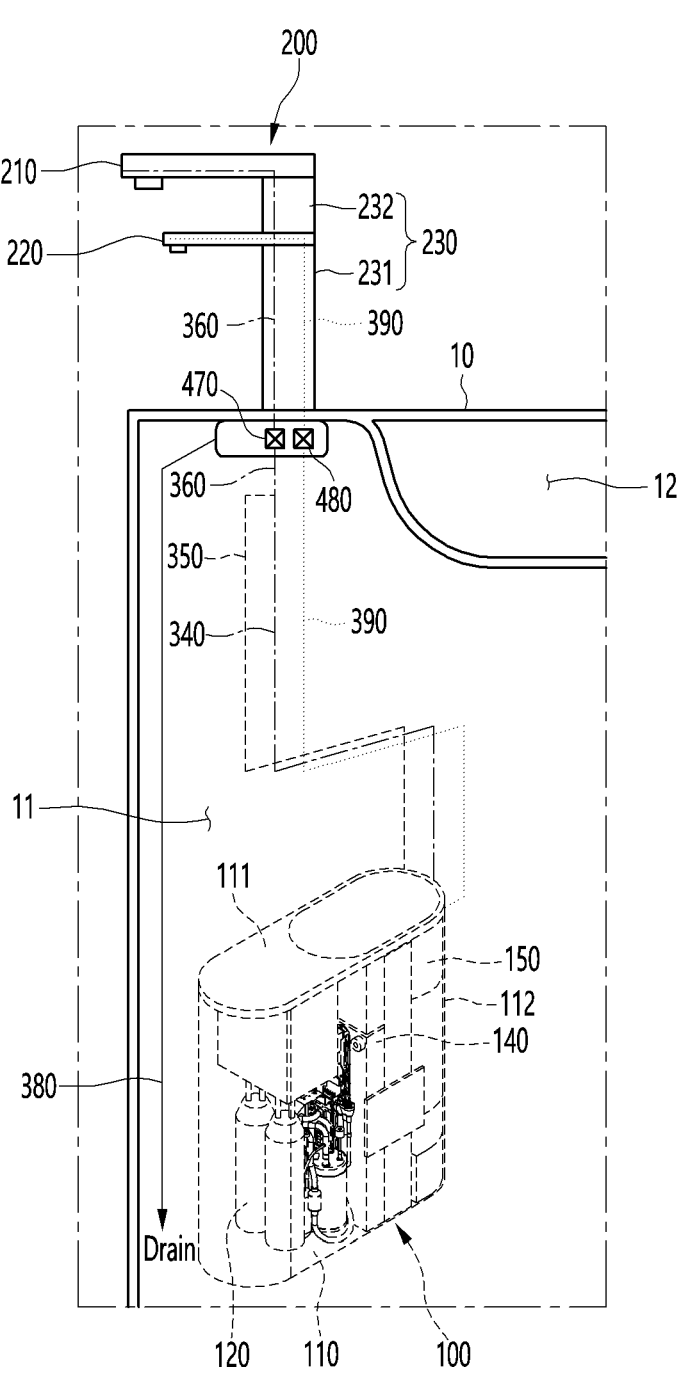
FIG. 1 is a diagram showing the state in which a water purifier is installed in a sink according to an embodiment of the present disclosure.
Figure 2:
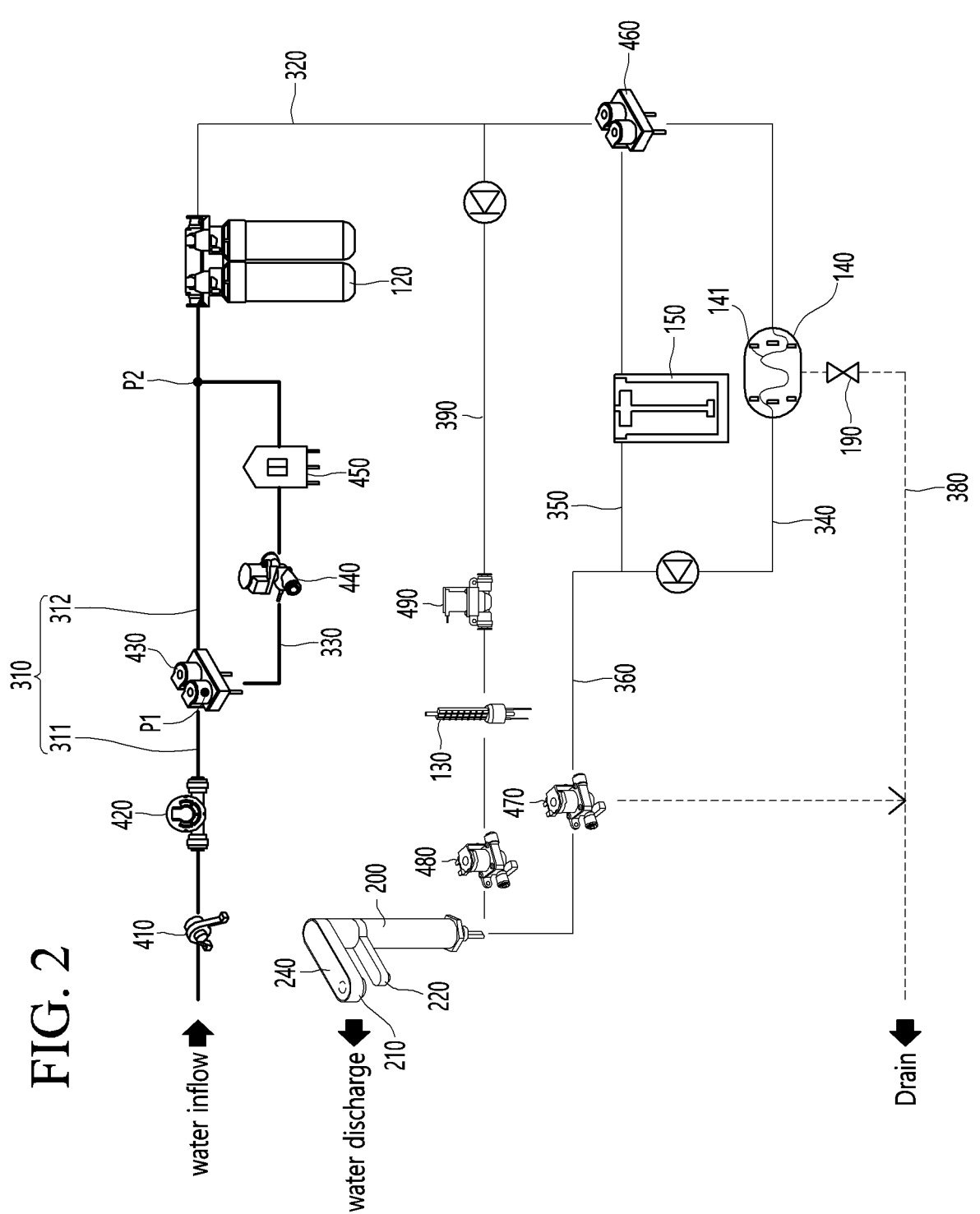
FIG. 2 is a water pipe diagram of a water purifier according to an embodiment of the present disclosure.
Figure 3:
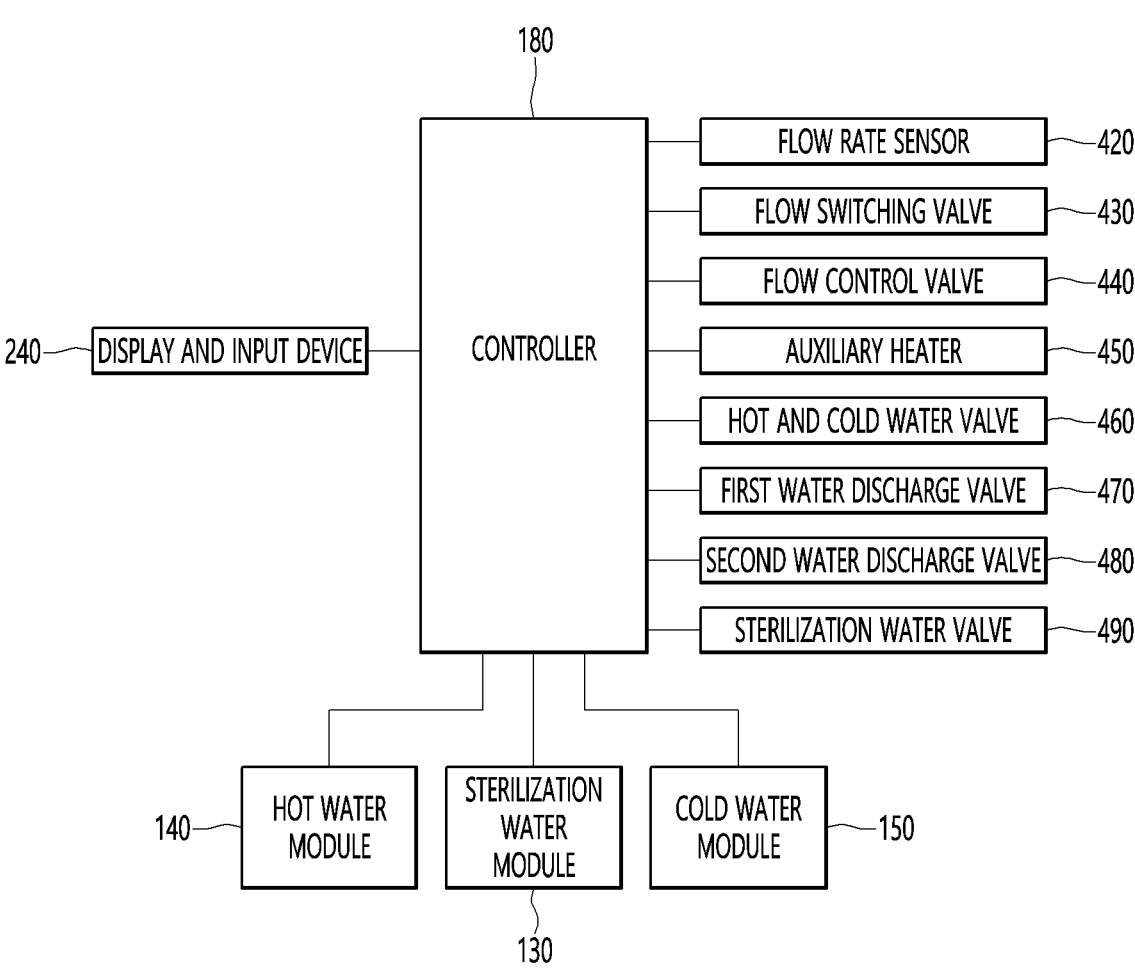
FIG. 3 is a block diagram showing components of a water purifier according to an embodiment of the present disclosure.

FIG. 1 is a diagram showing the state in which a water purifier is installed in a sink according to an embodiment of the present disclosure. FIG. 2 is a water pipe diagram of a water purifier according to an embodiment of the present disclosure. FIG. 3 is a block diagram showing components of a water purifier according to an embodiment of the present disclosure.

The water purifier according to the present disclosure may refer to various types of devices for introducing water from the outside, purifying the introduced water, and then discharging the water.

For example, the water purifier according to the present disclosure may be provided as an under sink type water purifier, at least a portion of which is disposed in a lower space of a sink 10.

The water purifier according to the present disclosure may refer to an all-in-one water purifier, a direct type water purifier, a desktop type water purifier, a stand-up type water purifier, or the like, and may be applied to various devices such as a refrigerator.

Referring to FIG. 1, the water purifier according to the present disclosure may include a body part 100 installed inside the sink 10, and a water outlet 200, at least a portion of which is exposed to the outside of the sink 10.

First, the body part 100 may include a housing 110 defining an outer appearance. The housing 110 may include a planar top cover 111 defining an upper surface. The housing 110 may have a front surface and a rear surface that are convex forward and rearward, respectively. Opposite surfaces connecting the front and rear surfaces and a bottom surface may define a flat surface.

The housing 110 may be provided in a box shape, and may be disposed in an accommodation space 11 provided under the sink 10.

The housing 110 may be provided in a slim form with a narrow left and right width and a long front and rear length. Thus, the housing 110 may be disposed in a left-right direction or in a front-rear direction inside the sink, and may be disposed at an inner corner of a space inside the sink, thereby improving space utilization.

A front surface of the housing 110 may be detached. When the front surface of the housing 110 is detached, a filter may be exposed, and a user may easily replace the filter exposed to the outside.

The water purifier according to the present disclosure may include a water supply flow path for guiding raw water supplied from the outside of the housing 110 to the inside of the housing 110, a filter 120 for purifying water supplied along the raw water pipe into purified water, and a water discharge pipe for flowing the purified water passing through the filter 120 toward the water outlet 200.

The water supply flow path may connect an external water supply source to the filter 120 inside the housing 110 while penetrating the housing 110. Through the water supply flow path, raw water supplied from the water supply source outside the housing 110 may be supplied to the filter 120.

As described above, the water (raw water) supplied to the filter 120 may be purified into purified water while passing through the filter 120. At least one filter 120 may be provided. For example, the filter 120 may be provided in two or more. Thus, water flowing in the water supply flow path may be purified into cleaner water while passing through the plurality of filters 120.

The purified water passing through the filter 120 may flow toward the water outlet 200 exposed outside the sink 10 through the water discharge pipe.

To this end, one end of the water discharge pipe may be connected to the filter 120, and the other end of the water discharge pipe may penetrate the housing 110, may be exposed outside the housing 110, and may then be connected to the water outlet 200. In this case, the water discharge pipe may penetrate a rear end (a right side based on FIG. 1) of the housing 110. The water discharge flow path may include a hot water flow path 340, a cold water flow path 350, and a sterilization water flow path 390, which will be described below.

As described above, in order for a water discharge pipe to pass through a rear end of the housing 110, a horizontally open connector 113 may be formed at an upper end of a rear cover 112 defining a rear surface of the housing 110.

The connector 113 may connect an internal side of the housing 110 to an external side thereof.

Through the connector 113, the water discharge flow path, that is, at least one of the hot water flow path 340, the cold water flow path 350, or the sterilization water flow path 390, which will be described below, may escape from the inside of the housing 110 to the outside.

Through the connector 113, at least one wire, wiring, or the like may escape from the inside of the housing 110 to the outside.

The other end of the water discharge flow path exposed outside the housing 110 may be directly connected to the water outlet 200, and may also be connected to the water outlet 200 through a separate pipe or component.

The water outlet 200 may include a plurality of water discharge nozzles 210 and 220 for supplying purified water, cold water, hot water, and sterilization water, which are supplied from the hot water flow path 340, the cold water flow path 350, and the sterilization water flow path 390, to a user. The plurality of water discharge nozzles 210 and 220 may extend in a horizontal direction from a body 230 extending in a vertical direction to be exposed to an upper side of the sink 10.

The water discharge nozzles 210 and 220 may include a first water discharge nozzle 210 for discharging purified water, cold water, and hot water, and a second water discharge nozzle 220 for discharging sterilization water.

For example, the first water discharge nozzle 210 and the second water discharge nozzle 220 may be spaced apart from each other in a vertical direction. In this case, the first water discharge nozzle 210 may be disposed at an upper side, and the second water discharge nozzle 220 may be provided at a lower side.

Thus, a problem in that the first water discharge nozzle 210 is contaminated by sterilization water discharged from the second water discharge nozzle 220 while the sterilization water is falling on the first water discharge nozzle 210 from which purified water, cold water, and hot water are taken out may be prevented. The first water discharge nozzle 210, from which cold, hot, and purified water, which is used relatively frequently, is discharged, may be arranged at an upper side, and thus a user may easily access, manipulate the first water discharge nozzle 210 and may easily discharge water. In addition, as the second water discharge nozzle 220 that is less used may be disposed at a lower side, the second water discharge nozzle 220 may be capable of being hidden, and it may be difficult for the user to access second water discharge nozzle 220 compared with the first water discharge nozzle 210, thereby preventing an accident of discharging and drinking sterilization water by mistake.

In another example, the first water discharge nozzle 210 and the second water discharge nozzle 220 may be spaced apart from each other in a horizontal direction.

The first water discharge nozzle 210 and the second water discharge nozzle 220 may be rotatably installed based on the body 230. The first water discharge nozzle 210 and the second water discharge nozzle 220 may be independently rotated.

Cold water flowing through the cold water flow path 350, and hot water and purified water flowing through the hot water flow path 340 may be discharged through the first water discharge nozzle 210.

Sterilization water generated by a sterilization water module 130 may flow in the sterilization water flow path 390 and may then be supplied to a user outside the sink 10 through the second water discharge nozzle 220.

A second water discharge valve 480 may be installed in the sterilization water flow path 390. The second water discharge valve 480 may also be installed between the sterilization water flow path 390 and the water outlet 200.

The second water discharge valve 480 may supply sterilization water flowing toward the water outlet 200 to the water outlet 200 through the sterilization water flow path 390 or may be discharged using a separate drain flow path 380.

The hot water flow path 340 and the cold water flow path 350 may be independently connected to the first water discharge nozzle 210. After being combined with each other, the hot water flow path 340 and the cold water flow path 350 may be connected to the first water discharge nozzle 210 through a common flow path 360.

A first water discharge valve 470 may be installed in the common flow path 360. The first water discharge valve 470 may also be installed between the common flow path 360 and the water outlet 200.

The first water discharge valve 470 may supply purified water, cold water, and hot water, which flow toward the water outlet 200, to the water outlet 200 through the common flow path 360 or may be discharged using the separate drain flow path 380.

The first water discharge valve 470 and the second water discharge valve 480 may be separately provided or may be provided as one body.

For reference, a drain flow path connected to the first water discharge valve 470 and a drain flow path connected to the second water discharge valve 480 may be separately provided, or one drain flow path may be commonly used.

As shown in FIG. 1, the water outlet 200 may be mounted on the sink 10 in such a way that at least a portion of the water outlet 200 is exposed to an upper side of the sink 10. Thus, the body 230, and the first water discharge nozzle 210 and the second water discharge nozzle 220, which extend to one side of the body 230, may be positioned above the sink 10 and may be exposed to the outside.

Conventionally, a device configured to discharge purified water, hot water, purified water, and sterilization water through a water discharge nozzle exposed outside a sink is not proposed unlike the present disclosure.

However, according to the present disclosure, the water discharge nozzle may be configured to discharge cold, hot, and purified water and sterilization water from one water outlet.

Even if the water outlet is configured to discharge purified, cold, and hot water, and sterilization water out of the sink, when the water discharge nozzle is disposed not to discharge purified, cold, and hot water, and sterilization water from the same point, in order to wash vegetables and fruits, a user needs to primarily wash bacteria and dirt on a surface of the vegetables and the fruits below a sterilization water discharge nozzle, to move the vegetables and the fruits washed with sterilization water under the water discharge nozzle for discharging purified water, to discharge purified water, and to secondarily wash and remove sterilization water on the vegetables and the fruits. Accordingly, as the first and second washes are performed in different places, a washing process is inevitably very cumbersome.

However, according to the present disclosure, an object to be cleaned may be placed at one location, sterilization water may be discharged through the second water discharge nozzle 220 to primarily wash the object, and then purified water may be discharged through the first water discharge nozzle 210 disposed above the second water discharge nozzle 220 to complete the purified water washing. Thus, as the primary washing and the secondary washing are performed in one place, the washing process may be very simple.

Water mainly used by the user may be purified water, hot water, cold water. Sterilization water may only be discharged under a special situation. Therefore, according to the present disclosure, the first water discharge nozzle 210 may be disposed above the second water discharge nozzle 220 to allow the user to select purified water discharging instead of selecting sterilization water discharging in an unconscious state.

In general, when sterilization water is discharged and drunk, sterilization water contains hypochlorous acid, which is not beneficial to user health.

Accordingly, according to the present disclosure, the first water discharge nozzle 210 for taking out cold, hot, and purified water may be disposed above a cylindrical body 230, and the second water discharge nozzle 220 for discharging sterilization water may be disposed therebelow.

The body 230 may include a lower body 231 disposed between the sink 10 and the second water discharge nozzle 220, and an upper body 232 disposed between the first water discharge nozzle 210 and the second water discharge nozzle 220.

According to the present disclosure, an upper water discharge nozzle and a lower water discharge nozzle may be separately rotated. If the upper water discharge nozzle and the lower water discharge nozzle are simultaneously rotated rather than being independently rotated, when purified, hot, and cold water are taken out from the upper water discharge nozzle, the lower water discharge nozzle may interfere with a container for getting water. Thus, two water discharge nozzles may each be rotated at a predetermined angle.

The water outlet 200 may include a display and input device 240.

For example, the display and input device 240 may be provided on an upper surface of the first water discharge nozzle 210. Thus, the display and input device may be positioned at the top of the water outlet 200.

The display and input device 240 may perform a function of selecting hot water, purified water, cold water, and sterilization water, a water discharge command function, a cold water and hot water temperature setting and displaying function, a drain selecting function, a filter replacement cycle notification function, a function of setting the amount of water to be discharged, a function of setting a water extraction time, etc.

In this case, the display and input device 240 may display the amount of water to be discharged in units of about 10 ml.

The display and input device 240 may display the amount of water to be discharged in units of about 10 ml to input a desired amount of water extraction.

In this case, a sterilization water selection button and a sterilization water discharge button may also be provided above the first water discharge nozzle 210, and thus a user may always recognize discharged water.

In another example, the sterilization water discharge button may also be provided above the second water discharge nozzle 220.

Hereinafter, with reference to FIGS. 1 to 3, a process of taking out purified, cold, and hot water, and sterilization water of a water purifier according to the present disclosure will be described.

Referring to FIGS. 2 to 3, the water purifier according to the present disclosure may discharge hot water and purified water, and here, the hot water and the purified water may be discharged through one flow path.

First, water supplied from a water supply source may be guided toward the filter 120 through a water supply flow path 310.

Purified water passing through the filter 120 may flow through an intermediate flow path 320.

The intermediate flow path 320 may have one side connected to an outlet of the filter 120 and the other side connected to an entrance of a hot water module 140, and may guide water passing through the filter 120 toward the hot water module 140.

Purified water or hot water passing through the hot water module 140 may be supplied toward a first water discharge nozzle 210 through the hot water flow path 340.

The hot water flow path 340 may be connected to the first water discharge nozzle 210 through the common flow path 360. Thus, water passing through the hot water module 140 and the hot water flow path 340 may pass through the common flow path 360 and may then be discharged using the first water discharge nozzle 210.

In this case, when power is supplied to the hot water module 140, and purified water is heated in the hot water module 140, hot water may be discharged using the first water discharge nozzle 210.

When power to the hot water module 140 is shut off, purified water passing through the hot water module 140 may be discharged using the first water discharge nozzle 210 in the state of purified water rather than being heated.

That is, according to the present disclosure, hot water and purified water may be discharged through one flow path.

Both hot water and purified water may be discharged using the first water discharge nozzle 210 through the water supply flow path 310, the filter 120, the intermediate flow path 320, the hot water module 140, the hot water flow path 340, and the common flow path 360.

A difference may be whether the hot water module 140 is operated. When purified water is discharged, a controller 180 may switch the hot water module 140 to an off state, and the hot water module 140 may not be operated, and purified water passing through the hot water module 140 may flow in the common flow path 360 in the state of purified water. In contrast, when hot water is discharged, the controller 180 may switch the hot water module 140 to an on off, and the hot water module 140 may be operated, and purified water passing through the hot water module 140 may be heated to hot water.

The hot water module 140 may include a hot water tank. A heating flow path 141 through which purified water passing through the filter 120 passes may be formed in the hot water tank, and purified water passing through the heating flow path 141 may be heated to hot water to discharge hot water. In contrast, when purified water is discharged, purified water passing through the heating flow path 141 may be maintained in the state of purified water without temperature change.

Referring to FIG. 2, the water purifier may include the hot water flow path 340 and the common flow path 360, which guide purified water or hot water passing through the hot water module 140 toward the first water discharge nozzle 210. That is, purified water or hot water discharged from the hot water module 140 may be discharged using the first water discharge nozzle 210 through the hot water flow path 340 and the common flow path 360.

The controller 180 may control an operation of the hot water module 140.

When purified water is discharged, the controller 180 may turn off a heat source of the hot water module 140 to discharge purified water discharged from the hot water module 140 using the first water discharge nozzle 210 through the hot water flow path 340 and the common flow path 360. That is, when purified water is discharged, the heat source of the hot water module 140 may be turned off, and purified water may be discharged in the state of purified water rather than being heat while passing through the heating flow path 141 of the hot water module 140. The purified water may be supplied to the first water discharge nozzle 210 through the hot water flow path 340 and the common flow path 360.

When hot water is discharged, the controller 180 may turn on the heat source of the hot water module 140 to supply hot water discharged from the hot water module 140 to the first water discharge nozzle 210 through the hot water flow path 340 and the common flow path 360. That is, when the heat source of the hot water module 140 is turned on, purified water may be heated while passing through the heating flow path 141 of the hot water module 140 and may be discharged in the state of hot water. Hot water discharged from the hot water module 140 may be supplied to the first water discharge nozzle 210 through the hot water flow path 340 and the common flow path 360.

Referring back to FIG. 2, the water purifier according to the present disclosure may further include an auxiliary flow path 330 that is branched from a first point P1 of the water supply flow path 310 and is then combined with a second point P2 of the water supply flow path 310, which is positioned behind the first point P1 based on a flow direction of water. A flow control valve 440 may be installed in the auxiliary flow path 330. The flow control valve 440 may control a flow rate of water passing through the auxiliary flow path 330.

For example, the flow control valve 440 may perform control to lower the flow rate of water passing through the auxiliary flow path 330.

The controller 180 may be connected to the flow control valve 440 to control the flow control valve 440. In detail, the controller 180 may open or close the flow control valve 440. The controller 180 may adjust a degree of opening of the flow control valve 440, and as a result, may adjust the flow rate of water passing through the auxiliary flow path 330.

A temperature sensor for detecting the temperature of the water passing through the auxiliary flow path 330 may be installed in the auxiliary flow path 330.

The temperature sensor may also be integrally installed with the flow control valve 440.

For reference, the temperature sensor may be installed in at least one of the water supply flow path 310, the intermediate flow path 320, the hot water flow path 340, or the common flow path 360. The temperature sensor may be installed in the hot water module 140 or may also be installed in the first water discharge valve 470 to be described below.

The controller 180 may be connected to the temperature sensor to receive information on the temperature of water, detected by the temperature sensor. Output of the hot water module 140 or an auxiliary heater 450 to be described below may be controlled using the received information on the temperature.

A flow switching valve 430 may be installed at the first point P1.

The flow switching valve 430 may control flow of water flowing to the auxiliary flow path 330 from the water supply flow path 310.

The controller 180 may control an operation of the flow switching valve 430.

For example, the flow switching valve 430 may include one entrance and two outlets. The entrance of the flow switching valve 430 may be connected to the water supply flow path 310, and one of the two outlets may be connected to the water supply flow path 310 again, and the other one may be connected to the auxiliary flow path 330.

The controller 180 may open and close the entrance of the flow switching valve 430 and may open and close an outlet of the flow switching valve 430. The controller 180 may select and open only one of outlets of the flow switching valve 430 and may block the other one. The controller 180 may open all the outlets of the flow switching valve 430 and may also block all the outlets of the flow switching valve 430.

Thus, water introduced into the flow switching valve 430 may be transferred to the water supply flow path 310 or may be transferred to the auxiliary flow path 330.

The water supply flow path 310 may include a first water supply flow path 311 for guiding water toward the flow switching valve 430 and a second water supply flow path 312 for guiding water discharged from the flow switching valve 430 toward the filter 120 based on the flow switching valve 430.

For example, through the first water supply flow path 311, water introduced to the flow switching valve 430 may flow only in the second water supply flow path 312 rather than flowing in a direction toward the auxiliary flow path 330.

In another example, through the first water supply flow path 311, water introduced to the flow switching valve 430 may flow only in a direction toward the auxiliary flow path 330, and may not flow in the second water supply flow path 312.

In another example, through the first water supply flow path 311, water flowing in the flow switching valve 430 may partially flow in a direction toward the auxiliary flow path 330 and may also partially flow in a direction toward the second water supply flow path 312.

When hot water is discharged, the controller 180 may control the flow switching valve 430 to allow water introduced through the first water supply flow path 311 to pass through the auxiliary flow path 330. In this case, water introduced to the flow switching valve 430 may be discharged only toward the auxiliary flow path 330 rather than being discharged toward the second water supply flow path 312.

Water passing through the auxiliary flow path 330 may be combined with the second water supply flow path 312 at the second point P2 and may then be supplied to the filter 120.

When purified water is discharged, the controller 180 may control the flow switching valve 430 to allow water introduced through the first water supply flow path 311 to flow only through the second water supply flow path 312.

In this case, water introduced to the flow switching valve 430 may be discharged only toward the second water supply flow path 312 rather than being discharged toward the auxiliary flow path 330.

Water discharged to the second water supply flow path 312 may be supplied to the filter 120.

In general, purified water may pass through the filter 120 and may then be supplied to the first water discharge nozzle 210 through a flow path. Thus, it may not be required to adjust a flow rate of water passing through the flow path, and the larger the flow rate, the better.

However, hot water may pass through the filter 120, may be heated to hot water, and may then be supplied to the first water discharge nozzle 210. Thus, in order to increase the temperature of the hot water, it may be required to adjust a flow rate of water introduced to the hot water module 140 to be lowered compared with purified water.

In this situation, when a flow control valve is installed in the water supply flow path 310 for supplying water to the filter 120 to adjust a flow rate supplied to the filter 120 to be low, the temperature of hot water may be increased to satisfy a condition of the hot water. However, when purified water is discharged, a problem of reducing a flow rate of purified water may also occur due to the flow rate adjusted to be low.

To overcome this, according to the present disclosure, when purified water is discharged, water introduced through the first water supply flow path 311 may be supplied to the filter 120 through the second water supply flow path 312. The flow control valve may not be installed in the second water supply flow path 312, and thus a flow rate of purified water may be prevented from being lowered, and a condition of a flow rate of purified water may be satisfied.

In contrast, when hot water is discharged, water introduced through the first water supply flow path 311 may be supplied to the filter 120 through the auxiliary flow path 330. The flow control valve 440 may be installed in the auxiliary flow path 330, the flow adjusted to be low by the flow control valve 440, and a flow rate supplied to the hot water module 140 may be lowered to increase the temperature of hot water and to satisfy a hot water temperature condition.

That is, according to the present disclosure, a path of water flowing from the water supply flow path 310 to the filter 120 may be divided into two branches, and thus water may flow only to the water supply flow path 310 to prevent a flow rate from being reduced when purified water is discharged, and the water of the water supply flow path 310 may flow to the auxiliary flow path 330 to lower the flow rate when hot water is discharged, thereby satisfying a temperature condition of the hot water.

As described above, purified water discharged from the filter 120 may flow toward the hot water module 140 through the intermediate flow path 320.

Water introduced to the hot water module 140 may be heated and may be discharged in the state of hot water, or may not be heated and may be discharged in the state of purified water and may flow in the hot water flow path 340.

Hot water or purified water flowing in the hot water flow path 340 may flow through the common flow path 360 and may then be supplied out of the water purifier through the first water discharge nozzle 210.

The common flow path 360 may have one side connected to the hot water flow path 340 and the other end connected to the first water discharge nozzle 210.

The first water discharge valve 470 for controlling flow of water flowing toward the first water discharge nozzle 210 may be installed in the common flow path 360.

The controller 180 may control an operation of the first water discharge valve 470.

In detail, the controller 180 may control the first water discharge valve 470 to be opened when purified water, hot water, or cold water is discharged, and may control the first water discharge valve 470 to be closed in a standby state in which water is not discharged.

After hot water is discharged, the hot water module 140 may be a heated state, and hot water may also be filled in the hot water flow path 340, the hot water module 140, and the common flow path 360.

In this situation, when a user discharges purified water, a problem in that hot water in the hot water flow path 340 or the hot water module 140 is discharged through the first water discharge nozzle 210 after purified water is discharged may occur.

Thus, after hot water is discharged, before purified water is discharged, it may be required to drain hot water (residual water) that remains in the hot water flow path 340, the hot water module 140, and the common flow path 360.

To this end, the water purifier according to the present disclosure may include a drain flow path 370.

The first water discharge valve 470 may be provided as a 3-way valve, and the drain flow path 370 may be connected to the first water discharge valve 470.

Water introduced to the first water discharge valve 470 may flow toward the first water discharge nozzle 210 and may also flow toward the drain flow path 370.

The first water discharge valve 470 may include one entrance and two outlets. The entrance of the first water discharge valve 470 may be connected to the common flow path 360 that extends toward the hot water flow path 340. One of the two outlets may be connected to the common flow path 360 that extends toward the first water discharge nozzle 210 again and the other one may be connected to the drain flow path 370.

The controller 180 may open and close the entrance of the first water discharge valve 470 and may open and close the outlets of the first water discharge valve 470. The controller 180 may select and open only one of outlets of the first water discharge valve 470 and may block the other one. The controller 180 may open all the outlets of the first water discharge valve 470 and may also block all the outlets of the first water discharge valve 470.

Thus, water introduced into the first water discharge valve 470 may be discharged to the common flow path 360 that extends toward the first water discharge nozzle 210 and may be discharged through the first water discharge nozzle 210 or may be discharged to the drain flow path 370.

For example, when hot water is discharged, the first water discharge valve 470 may be opened to discharge water to the common flow path 360 that extends toward the first water discharge nozzle 210.

In another example, when hot water is completely discharged, the outlet of the first water discharge valve 470, which is connected to the drain flow path 370, may be opened to drain residual water in the hot water flow path 340, the common flow path 360, or the hot water module 140.

As described above, when hot water is drained after being discharged, the hot water flow path 340, the common flow path 360, or the hot water module 140 may be filled with purified water or may be empty.

Thus, when purified water is discharged after hot water is discharged, a problem in that the temperature of the purified water is increased by residual water at high temperature may be prevented.

In the state in which hot water is not drained after being discharged, when purified water is discharged, even if the hot water module 140 is turned off, a residual water at high temperature may remain in the hot water flow path 340, the common flow path 360, or the hot water module 140, and thus a problem in that water at high temperature is discharged through the first water discharge nozzle 210 may occur.

For reference, the draining may be performed until residual water in the hot water tank is discharged.

According to the present disclosure, when hot water is completely discharged, draining may be performed irrespective of whether purified water is discharged.

That is, when hot water is discharged, the hot water module 140 may be operated, and an outlet of the first water discharge valve 470 at the first water discharge nozzle 210 may be opened.

When hot water is completely discharged, the hot water module 140 stops being operated, an outlet of the first water discharge valve 470 at the drain flow path 370 may be opened, and hot water in the hot water flow path 340 or the hot water module 140 may be drained through the drain flow path 370.

When a preset drain time elapses, an outlet of the first water discharge valve 470 at the drain flow path 370 may be blocked.

According to the present disclosure, when hot water is completely discharged and purified water is being discharged, elapsed time may be checked after hot water is discharged, and draining may be selectively performed according to the elapsed time.

According to the p resent disclosure, when hot water is completely discharged and purified water is discharged, the temperature of residual water in the hot water flow path 340, the common flow path 360, the hot water module 140, or the first water discharge valve 470 may be checked, and draining may also be selectively performed depending on the checked temperature.

Referring back to FIG. 5, the water purifier according to the present disclosure may have a cold water discharge function.

To this end, the water purifier may further include the cold water flow path 350 having one side branched from the intermediate flow path 320 and the other side combined with the common flow path 360, and a cold water module 150 installed in the cold water flow path 350 and configured to cool purified water passing through the cold water flow path 350 into cold water.

A hot and cold water valve 460 may be installed at a branch point of the cold water flow path 350 in the intermediate flow path 320.

The controller 180 may control an operation of the hot and cold water valve 460.

For example, when hot water or purified water is discharged, the controller 180 may control the hot and cold water valve 460 to be opened toward the hot water module 140.

In another example, when cold water is discharged, the controller 180 may control the hot and cold water valve 460 to be opened toward the cold water flow path 350.

The hot and cold water valve 460 may include one entrance and two outlets. The entrance of the hot and cold water valve 460 may be connected to the intermediate flow path 320 that extends toward the filter 120. One of the two outlets may be connected to the intermediate flow path 320 that extends toward the hot water module 140 again, and the other one may be connected to the cold water flow path 350.

The controller 180 may open and close the entrance of the hot and cold water valve 460 and may open and close the outlet of the hot and cold water valve 460. The controller 180 may select and open only one of the outlets of the hot and cold water valve 460 and may close the other one. The controller 180 may open all the outlets of the hot and cold water valve 460 and may close all the outlets of the first water discharge valve 470.

Thus, water introduced to the hot and cold water valve 460 may be discharged to the intermediate flow path 320 that extends toward the hot water module 140 and may be supplied to the hot water module 140 or may be discharged to the cold water flow path 350.

In a modified example, hot water may be discharged and heated, and the hot water flow path 340, the hot water module 140, and the common flow path 360 may also be filled with hot water.

In this situation, when a user discharges purified water, a problem in that hot water in the hot water flow path 340 or the hot water module 140 is discharged through the first water discharge nozzle 210 before purified water is discharged may occur.

The controller 180 may perform control the temperature of water discharged using the first water discharge nozzle 210 to be low through cold water.

According to the present embodiment, when purified water is discharged within a reference time after hot water is discharged, the controller 180 may control the hot and cold water valve 460 to open an outlet at the intermediate flow path 320, connected to the hot water module 140, and to also open an outlet at the cold water flow path 350.

Here, the 'reference time' may be variously set. For example, the 'reference time' may be set to 60 minutes.

After hot water is discharged, before the reference time elapses, when purified water is discharged, the controller 180 may simultaneously open both outlets of the hot and cold water valve 460, and here, the controller 180 may control an outlet at the cold water flow path 350 to be opened for a first time and to be then closed, and may control an outlet at the intermediate flow path 320, connected to the hot water module 140, to be opened for a second time longer than the first time.

Her, the 'first time' and the 'second time' may be variously set. For example, the 'first time' may be set to 3 seconds.

Water discharged through the cold water flow path 350 and the hot water flow path 340 may be combined in the common flow path 360 and may then be discharged through the first water discharge nozzle 210.

According to the present disclosure, when hot water is completely discharged and purified water is discharged, elapsed time may be checked after hot water is discharged, and a portion of cold water may be selectively combined with residual water according to the elapsed time.

According to the present disclosure, when hot water is completely discharged and purified water is discharged, the temperature of residual water of the hot water flow path 340, the common flow path 360, the hot water module 140, or the first water discharge valve 470 may be checked, and a portion of cold water may be selectively combined with residual water according to the checked temperature.

Thus, when purified water is discharged through the hot water flow path, a problem in that hot water or lukewarm water is initially discharged due to residual hot water when purified water is discharged may be overcome.

Referring back to FIG. 2, at least one of a pressure reducing valve 410 for adjusting a pressure of water introduced from the water supply source or a flow rate sensor 420 for checking a flow rate of water passing through the water supply flow path 310 may be installed in the water supply flow path 310.

For example, the pressure reducing valve 410 and the flow rate sensor 420 may be sequentially installed in the first water supply flow path 311 based on a flow direction of water.

The controller 180 may be connected to the flow rate sensor 420 to receive flow rate information detected by the flow rate sensor 420. Output of the hot water module 140 or the auxiliary heater 450 to be described below may be controlled using the received flow rate information.

<Hot Water Sterilization>

The water purifier according to the present disclosure may have a hot water sterilization function.

Referring back to FIG. 2, the auxiliary heater 450 for heating water flowing in the auxiliary flow path 330 may be installed in the auxiliary flow path 330.

The auxiliary heater 450 may be formed behind the flow control valve 440 based on a flow direction of water.

The controller 180 may control the overall operation of the auxiliary heater 450.

When hot water is sterilized, the controller 180 may operate the auxiliary heater 450 and may stop operations of the hot water module 140 and the cold water module 150.

Hot water that is heated while passing through the auxiliary heater 450 may pass through the filter 120 and may then flow toward the first water discharge nozzle 210.

As described above, when the auxiliary heater 450 is operated, the auxiliary flow path 330 in which the auxiliary heater 450 is installed, the filter 120, the intermediate flow path 320, the hot water flow path 340, the cold water flow path 350, and the common flow path 360 may be sterilized by hot water.

During sterilization with hot water, the controller 180 may control the flow switching valve 430 to allow water in the first water supply flow path 311 to flow toward the auxiliary flow path 330.

The controller 180 may control the hot and cold water valve 460 to allow water flowing in the intermediate flow path 320 after being discharged from the filter 120 to flow toward the cold water flow path 350 or the hot water flow path 340.

For example, the controller 180 may control the hot and cold water valve 460 to allow water flowing in the intermediate flow path 320 after being discharged from the filter 120 to flow toward the cold water flow path 350.

In another example, the controller 180 may control the hot and cold water valve 460 to allow water flowing in the intermediate flow path 320 after being discharged from the filter 120 to flow toward the hot water module 140 and the hot water flow path 340.

In another example, the controller 180 may control the hot and cold water valve 460 to allow water flowing in the intermediate flow path 320 after being discharged from the filter 120 to flow toward the cold water flow path 350 and the hot water flow path 340.

In this case, water flowing in the intermediate flow path 320 after being discharged from the filter 120 may simultaneously flow toward the cold water flow path 350 and the hot water flow path 340.

Water flowing in the intermediate flow path 320 after being discharged from the filter 120 may first flow sequentially toward the cold water flow path 350 and may then flow toward the hot water flow path 340 or may first flow toward the hot water flow path 340 and may then flow toward the cold water flow path 350.

During sterilization with hot water, the controller 180 may control the first water discharge valve 470 to allow water in the common flow path 360 to flow toward the first water discharge nozzle 210 or the drain flow path 370.

For example, the controller 180 may control the first water discharge valve 470 to allow water introduced to the first water discharge valve 470 through the common flow path 360 to flow toward the first water discharge nozzle 210.

In another example, the controller 180 may control the first water discharge valve 470 to allow water introduced to the first water discharge valve 470 through the common flow path 360 to flow toward the drain flow path 370.

In another example, the controller 180 may control the first water discharge valve 470 to allow water introduced to the first water discharge valve 470 through the common flow path 360 to flow toward the first water discharge nozzle 210 and to flow toward the drain flow path 370.

In this case, water introduced to the first water discharge valve 470 through the common flow path 360 may simultaneously flow toward the first water discharge nozzle 210 and the drain flow path 370.

Water introduced to the first water discharge valve 470 through the common flow path 360 may first flow sequentially toward the first water discharge nozzle 210 and may then flow toward the drain flow path 370 or may first flow toward the drain flow path 370 and may then flow toward the first water discharge nozzle 210.

A water purifier according to the present disclosure may further include a drain flow path 380 and a safety valve 190 for discharging steam generated when hot water is heated in the hot water module 140. Thus, a pressure inside the hot water tank included in the hot water module 140 may be prevented being excessively increased due to the steam. The safety valve 190 may be configured to be opened at a predetermined pressure, and may have various structures for smoothly discharging steam inside the hot water tank.

Thus, steam discharged from the hot water tank may be discharged out of the water purifier through the drain flow path 380.

As described above, according to the present disclosure, hot water is being sterilized while water is continuously discharged, and thus foreign substances may be advantageously removed simultaneously while a flow path and a valve are sterilized by flow velocity.

According to the present disclosure, some of hot water generated while an entire flow path included in the water purifier is sterilized with hot water and is washed with hot water may be discharged to the water discharge nozzle, and the others may be drained out of the water purifier, and thus it may be possible to prevent a safety accident such as burns that may occur when a large amount of hot water is discharged to the water discharge nozzle, and there may also be an advantage in that a user avoids hassle to process a large amount of hot water.

<Sterilization Water Module>

Referring back to FIGS. 1 to 3, the water purifier according to the present disclosure may have a function of generating and discharging sterilization water.

To this end, the water purifier may include the sterilization water flow path 390 having one side branched from the intermediate flow path 320 and the other side connected the water outlet 200, and the sterilization water module 130 installed in the sterilization water flow path 390 and configured to electrolyze water passing through the sterilization water flow path 390 into sterilization water, and the controller 180 may control an operation of the sterilization water module 130.

Accordingly, water branched to the sterilization water flow path 390 may be supplied toward the water outlet 200 in the state of sterilization water while passing through the sterilization water module 130 provided on the sterilization water flow path 390.

A sterilization water valve 490 for controlling flow of water flowing in the sterilization water flow path 390 may be installed in the sterilization water flow path 390.

The sterilization water valve 490 may control flow of water flowing in the sterilization water module 130.

When a user requests to discharge sterilization water, a sterilization water valve 490 may be opened. As described above, when the sterilization water valve 490 is opened, purified water of the intermediate flow path 320 may pass through the sterilization water flow path 390 and the sterilization water valve 490, and water of the sterilization water flow path 390 may pass through the sterilization water module 130. Sterilization water generated in the sterilization water module 130 may flow toward the water outlet 200 along the sterilization water flow path 390 and may be supplied to the outside through the second water discharge nozzle 220, through the second water discharge valve 480.

<Sterilization Water Module Position>

Figure 4:
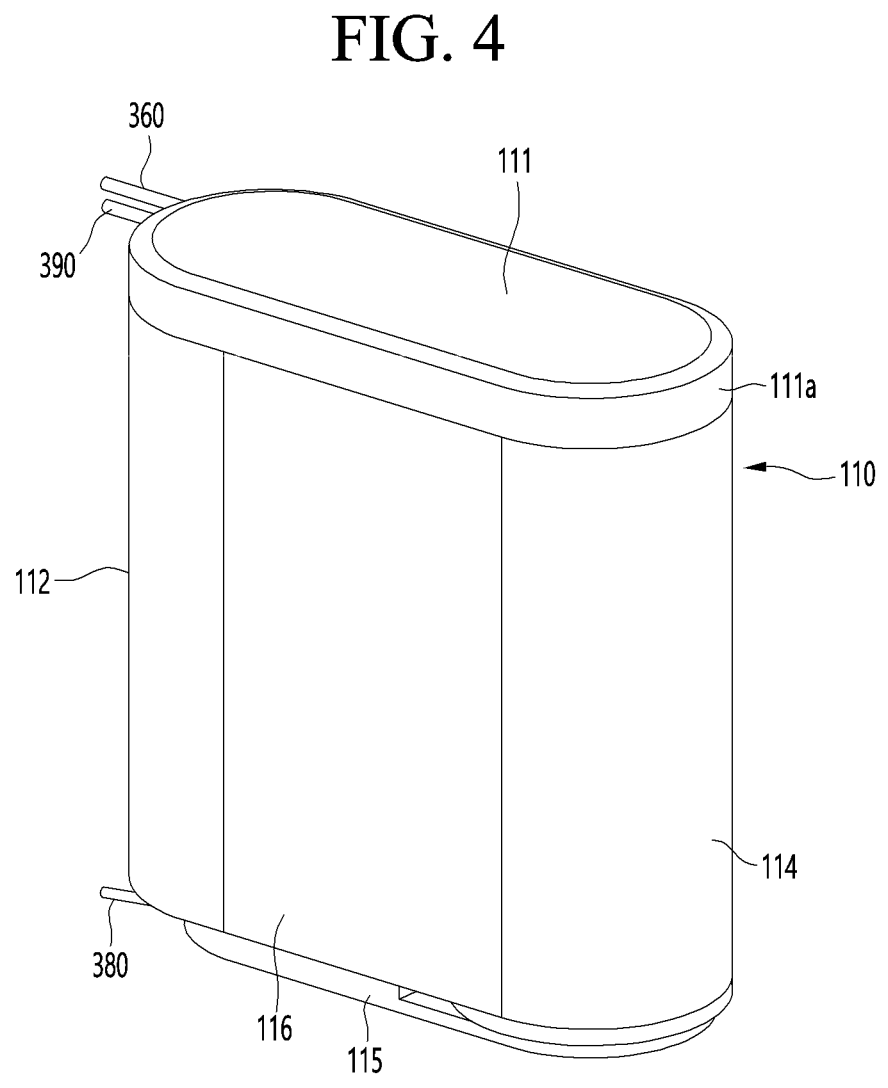

FIG. 4 is a perspective view of a body part of a water purifier, viewed from a front surface of the water purifier. FIG. 5 is a diagram showing the state in which a front cover is separated from the front cover of FIG. 4. FIG. 6 is a diagram showing the state in which an accommodate ion groove cover is separated in FIG. 5. FIG. 7 is a diagram showing the state in which a sterilization water module is separated in FIG. 6.

Referring to FIGS. 4 to 7, the housing 110 may include a front cover 114 defining a front surface.

The front cover 114 may be detachably coupled to the body part 100. The housing 110 may include side panels 116 defining opposite side surfaces, and may include the rear cover 112 defining a rear surface, and a base 115 defining a bottom surface.

The body part 100 may define an accommodation groove 161 concave inwardly from an upper part of one side.

In detail, when the front cover 114 of the housing 110 is removed, an internal cover 160 and the filter 120 may be exposed to the outside. When the internal cover 160 may be disposed at an upper side, and the filter 120 may be disposed at a lower side. The accommodation groove 161 may be concave inwardly from one side (the left side in the drawing) of the internal cover 160.

The sterilization water module 130 may be accommodated in the accommodation groove 161.

An open entrance of the accommodation groove 161 may be opened and closed by a separate accommodation groove cover 170. The accommodation groove cover 170 may be detachably provided on the internal cover 160.

For example, the front cover 114 may be convex forward viewed from above and below.

The internal cover 160 may also be convex forward viewed from above and below to correspond to the front cover 114. The accommodation groove cover 170 may be curved to be smoothly connected to an external surface of the internal cover 160.

As described above, when the accommodation groove 161 and the accommodation groove cover 170 are formed, the sterilization water module 130 may be easily checked and replaced. If the sterilization water module 130 needs to be checked and replaced, when the front cover 114 is separated from the body part 100, and the accommodation groove cover 170 exposed to the outside is separated from the internal cover 160, the sterilization water module 130 may be exposed to separate and install the sterilization water module 130.

FIG. 8 is a diagram of a body part viewed from a front surface when a front cover is separated. FIG. 9 is a diagram showing the state in which an accommodation groove cover is separated in FIG. 8. FIG. 10 is a cross-sectional view taken along A-A' of FIG. 8.

Referring to FIGS. 6 to 10, the internal cover 160 of the body part 100 may define an upper surface part 162 that horizontally extends inwardly from an upper end defining an entrance of the accommodation groove 161.

The accommodation groove cover 170 may include an upper end part 171 extending in a horizontal direction from an upper end to surface-contact the upper surface part 162, and a hook part 172 formed at an end of the upper end part 171 and fixed to an end of the upper surface part 162 in a hook manner.

Thus, the accommodation groove cover 170 may be fixed to the internal cover 160 using a hook fastening method in the state in which an entrance of the accommodation groove 161 is shielded.

The internal cover 160 of the body part 100 may define a lower surface part 163 extending inwardly from a lower end defining the entrance of the accommodation groove 161, and the accommodation groove cover 170 may define a lower end part 173 that extends in a horizontal direction from a lower end and is accommodated at an upper end of the lower surface part 163. Accordingly, the accommodation groove cover 170 may be accommodated in the internal cover 160.

An auxiliary groove part 164 concave downward may be formed on the internal cover 160 of the body part 100, and an auxiliary protrusion 174 inserted into the auxiliary groove part 164 may be formed on the accommodation groove cover 170.

In this case, the auxiliary groove part 164 may be formed at one side (the right side in the drawing) of the accommodation groove 161, and the auxiliary protrusion 174 may protrude toward one side (the right side in the drawing) of the accommodation groove cover 170.

The auxiliary protrusion 174 may be inserted into the auxiliary groove part 164, and the accommodation groove cover 170 may be accommodated on the internal cover 160.

In the above case, the sterilization water module 130 may be disposed in a free space, thereby advantageously increasing space utilization.

The sterilization water module 130 may have an inlet pipe 131 disposed downward, and an outlet pipe 132 disposed upward. Thus, water introduced through the inlet pipe 131 may flow upward from a lower part of the inside of the sterilization water module 130. The outlet pipe 132 may be positioned above the sterilization water module 130 to discharge sterilization water to the outside of the sterilization water module 130 through the outlet pipe 132.

The inlet pipe 131 and the outlet pipe 132 may each be connected to the sterilization water flow path 390. Thus, purified water introduced to the sterilization water flow path 390 may be introduced to the sterilization water module 130 through the inlet pipe 131, and sterilization water generated in the sterilization water module 130 may be discharged out of the sterilization water module 130 through the outlet pipe 132 and may then be supplied toward the water outlet 200 through the sterilization water flow path 390.

As described above, when the inlet pipe 131, to which purified water is introduced, is disposed at a lower side and the outlet pipe 132, from which sterilization water is discharged, is disposed at an upper side, water may slowly flow to the upper side from the lower side, and bubbles generated while sterilization water is generated may be collected in the upper side and may then be discharged to the outlet pipe 132.

When the inlet pipe 131 is positioned above the sterilization water module 130, water introduced through the inlet pipe 131 may rapidly flow downward by gravity, purified water may be discharged without sufficiently reacting with an electrode inside the sterilization water module 130, and it may be difficult to ensure a desired concentration of sterilization water.

When the inlet pipe 131 and the outlet pipe 132 are arranged in a horizontal direction, bubbles generated while sterilization water is generated may not be smoothly discharged, thereby lowering sterilization water production efficiency.

To overcome this problem, the sterilization water module 130 may be installed in such a way that the inlet pipe 131 and the outlet pipe 132 are disposed in a vertical direction, the inlet pipe 131 is disposed at a lower side, and the outlet pipe 132 is disposed at an upper side.

For reference, two electrode parts may face each other inside the sterilization water module 130.

The electrode part may include a first electrode and a second electrode, and as high concentration ozone is generated by inducing electrolysis reaction in water, sterilization water mixed with ozone having strong sterilization power may be generated.

In the above sterilization water module 130, the generated sterilization water may be provided to a sink through the second water discharge nozzle 220, and a user may wash dishes and vegetables using sterilization water.

<Stirring Member>

FIG. 11 is a perspective view of a stirring member applied to a cold water module according to the present disclosure. FIG. 12 is a cross-sectional view of a cold water module applied to a water purifier according to the present disclosure.

As described above, according to the present disclosure, the water purifier may include the cold water flow path 350 having one side branched from the intermediate flow path 320 and the other end connected to the water outlet 200. The cold water module 150 for cooling purified water passing through the cold water flow path 350 into cold water may be installed in the cold water flow path 350.

Referring to FIGS. 11 to 12, the cold water module 150 according to the present disclosure may include a coolant tank 151 in which a coolant is stored, and an insulation case 152 surrounding an external surface of the coolant tank 151 to insulate a coolant from outside air.

The cold water module 150 may include the cold water flow path 350 which is accommodated in the coolant tank 151 and in which drinking water flows, a partition member 153 placed above the cold water flow path 350 in the coolant tank 151, an evaporator 154 placed above the partition member 153, and a stirring member 500 penetrating the partition member 153 and placed inside the cold water flow path 350.

The partition member 153 may be horizontally placed in a horizontal direction of the coolant tank 151 to divide an internal space of the coolant tank 151 into an upper space in which the evaporator 154 is placed and a lower space in which the cold water flow path 350 is placed.

A plurality of lattice ribs may be formed in the partition member 153, and cold water above the partition member 153 and cold water below the partition member 153 may be circulated by an operation of the stirring member 500.

The evaporator 154 may be wound multiple times in a circumferential direction.

The stirring member 500 may be placed inside the cold water flow path 350 through an opening formed inside the partition member 153. As shown in the drawings, the cold water flow path 350 may be wound in a spiral shape to have a cylindrical shape with a predetermined length and diameter.

The cold water module 150 may further include a tank cover 155 for covering an open upper end of the coolant tank 151, a stirring motor 156 accommodated on an upper surface of the tank cover 155, and a case cover 157 for covering an open upper end of the insulation case 152 above the tank cover 155.

That is, the insulation case 152 may have an open upper side to accommodate the coolant tank 151 in an internal space thereof, and the case cover 157 may cover an open upper side of the insulation case 152.

A rotating shaft of the stirring motor 156 may penetrate the center of the tank cover 155 and may extend inside the coolant tank 151, and an upper end of the stirring member 500 may be connected to the rotating shaft of the stirring motor 156.

The stirring member 500 may include a shaft part 510 connected to a motor shaft of the stirring motor 156, and blade parts (or impeller parts) 520 and 530 formed on an intermediate part and a lower end of the shaft part 510. The shaft part 510 may be formed with a length to be placed at a point at which the blade parts 520 and 530 are spaced apart downward from the lower end of the partition member 153 at a predetermined interval.

Referring to FIG. 11, the blade parts 520 and 530 may have a plurality of blades 521 and 531 inclined to one side and arranged along a periphery of the shaft part 510.

For example, the blades 521 and 531 may be formed flat. The blades 521 and 531 may be formed as a square plate.

The blades 521 and 531 may be formed with rounded external corner parts that are not connected to the shaft part 510 to define curved parts 522 and 532.

A flange 540 in the form of a disk horizontally extending outward may be formed at an upper end of the shaft part 510, and a motor coupler 550 connected to the rotating shaft of the motor may be formed above the flange 540.

Blade fixers 560 and 570 connected to the blades 521 and 531 may be formed at a central part and a lower end of the shaft part 510, respectively. The blade fixers 560 and 570 may each form a square cross section.

A cross section of the shaft part 510 may have a cross (+) shape. At least one disk-shaped reinforcing part 580 may be formed on the shaft part 510.

The blade parts 520 and 530 may include an upper blade part 520 formed on a middle part of the shaft part 510 and a lower blade part 530 formed on a lower end of the shaft part 510.

The blade 521 of the upper blade part 520 and the blade 531 of the lower blade part 530 may be arranged to be inclined in a vertical direction. That is, the blade 521 of the upper blade part 520 and the blade 531 of the lower blade part 530 may be inclined in the same direction based on a longitudinal centerline of the shaft part 510 when viewed from the side.

In this case, based on a vertical direction, the blade 521 of the upper blade part 520 may be inclined at a first angle, and the blade 531 of the lower blade part 530 may be inclined at a second angle smaller than the first angle. For reference, the first angle and the second angle may refer to angles defined by the shaft part 510 and upper surfaces of the blades 521 and 531 when viewed from the side.

FIG. 13 is a diagram showing analysis of flow in a cold water module when a stirring member is operated according to the present disclosure. FIGS. 14 to 15 are tables showing comparison of cold water discharging temperature and cooling performance for each shape of a stirring member.

As seen from FIG. 13, according to the present disclosure, the upper blade part 520 and the lower blade part 530 may be separately formed on the shaft part 510, and upper flow and lower flow may each occur.

Accordingly, through rotation of the upper blade part 520, separate flow may occur in an upper space in which an evaporator is disposed, thereby advantageously lowering the overall water temperature in the coolant tank 151. In addition, through rotation of the lower blade part 530, separate flow may occur in a lower space in which the cold water flow path 350 is disposed, and heat exchange may be performed faster and more reliably, thereby advantageously lowering cold water discharging temperature.

Referring to FIGS. 14 to 15, in the case of a stirring member (dual blade case 2) applied to the present disclosure, an average cold water temperature of 6 glasses was 6.7 to 6.8° C. which was the lowest.

<Faucet Connection Structure>

FIG. 16 is a diagram showing a procedure of connecting a flow path and a wire of a water purifier to a housing according to the present disclosure.

Referring to FIG. 16, the housing 110 may include the connector 113 that is open in a horizontal direction along a periphery on an upper side of a rear surface to connect the inside and the outside of the housing 110.

The top cover 111 of the housing 110 may include an extension 111*a* extending downward along a periphery, and the connector 113 may be formed on the extension 111*a*. A lower end of the extension 111*a* may be connected to the rear cover 112 defining a rear surface of the housing 110, the side panels 116 defining opposite side surfaces of the housing 110, and an upper end of the front cover 114 defining a front surface of the housing 110.

The connector 113 may include a first connector 113*a* having a first height and a second connector 113*b* having a second height lower than the first height and connected to one side (the right side in the drawing) of the first the connector 113.

The first connector 113*a* may be concave upwardly from the lower end of the extension 111*a*.

In this case, through the first connector 113*a*, various flow paths may pass, and through the second connector 113*b*, various wires 400 may pass.

Here, the flow path may refer to at least one of the water supply flow path 310, the intermediate flow path 320, the auxiliary flow path 330, the hot water flow path 340, the cold water flow path 350, the common flow path 360, the drain flow path 380, or the sterilization water flow path 390.

The water purifier may further include a connector cover 117 that is inserted through the first connector 113*a* and then shields the second connector 113*b*.

In this case, the first connector 113*a* may be formed larger than the connector cover 117.

The connector cover 117 may define slide grooves 117*a*, into which upper and lower ends defining the second connector 113*b* are inserted, at upper and lower sides, and the connector cover 117 may be fixed to the second connector 113*b* using a sliding method.

Slide protrusions 113*c* inserted into the slide grooves 117*a* may be formed on the upper and lower ends defining the second connector 113*b*, respectively.

The connector cover 117 may be formed of an elastic material such as rubber or silicon to be easily deformed.

At least one through hole 117*b* through which the flow path or the wires 400 pass may be formed in the connector cover 117.

The plurality of through holes 117*b* may be provided. The plurality of through holes 117*b* may be formed with the same diameter. The plurality of through holes 117*b* may be formed with different diameters.

The plurality of through holes 117*b* may be provided, and at least some of the through holes 117*b* may be connected to each other.

As described above, when the connector 113 and the connector cover 117 are formed, the wires 400 may be fixed by inserting the wires 400 into the connector cover 117 and then inserting the connector cover 117 into the second connector 113*b* through the first connector 113*a*.

Without separation of the top cover 111, the wires 400 may be connected to the body part 100 through the rear surface of the housing 110, thereby advantageously improving workability. In the state in which the housing 110 is assembled, the wires 400 may be connected to the rear surface of the housing 110, thereby advantageously improving assembly.

<Corrugated Pipe Structure>

FIG. 17 is a diagram showing the state in which a pipe applied to a water purifier is straightened according to the present disclosure. FIG. 18 is an enlarged view of a part of FIG. 17. FIG. 19 is a diagram showing the state in which a pipe applied to a water purifier is bent according to the present disclosure.

Referring to FIGS. 17 to 19, at least one pipe 300 of a water purifier according to the present disclosure may be provided in a bendable form.

For example, the pipe 300 may be made in the form of a corrugated pipe and may be provided to be bent and deformed.

In the following description, the case in which the pipe 300 is the hot water flow path 340, the cold water flow path 350, or the sterilization water flow path 390 will be described, but the present disclosure is not limited thereto.

The pipe 300 may refer to at least one of the water supply flow path 310, the intermediate flow path 320, the auxiliary flow path 330, the hot water flow path 340, the cold water flow path 350, the common flow path 360, the drain flow path 380, or the sterilization water flow path 390.

As described above, the housing 110 may include the connector 113 that is open in a horizontal direction along a periphery on an upper side of a rear surface to connect the inside and the outside of the housing 110.

Through the connector 113, a pipe extending outward from the inside of the housing 110, for example, the hot water flow path 340, the cold water flow path 350, or the sterilization water flow path 390 may pass.

The pipe 300 may include a corrugated section 301 corrugated in a longitudinal direction.

The corrugated sections 301 may be formed at least two points of the pipe 300 and may be spaced apart from each other.

In the remaining section in which the corrugated section 301 is not formed, straight sections 302 in which no wrinkles are formed may be formed.

For example, the straight sections 302 may be formed at opposite ends of the pipe 300.

The straight sections 302 may be formed between the corrugated sections 301 of the pipe 300.

The pipe 300 may be formed of a metallic material. For example, the pipe may be formed of a stainless steel material.

The pipe 300 may also be formed of a synthetic resin material.

An entire section of the pipe 300 may be formed as a corrugated section.

The corrugated section 301 may be deformed when being bent by an operator bends with his or her hand and may be maintained in a deformed state. In addition, in the deformed state, when the operator spreads the corrugated section 301 by his or her hand, an unfolded state may be maintained.

As described above, when the corrugated section 301 is formed in at least a portion of the pipe 300, a direction in which the pipe 300 extends may be easily changed.

When the corrugated sections 301 are formed at three points of the pipe 300, a shape of the pipe 300 may be easily deformed according to an environment in which the body part 100 is installed.

Edges of one end or opposite ends of the pipe 300 may be chamfered to form an inclined surface 304.

An end groove 303 concave along a periphery of the pipe 300 may be formed at a position that is spaced apart from one end or opposite ends of the pipe 300 by a first interval. The end groove 303 may be formed into a curved surface.

As described above, according to the present disclosure, without a separate purified water flow path and purified water valve, a flow path may be implemented to discharge hot water and purified water through a hot water flow path, thereby advantageously reducing the material cost corresponding to provision of the purified water flow path and the purified water valve.

The configuration of the purified water flow path and the purified water valve may be omitted, thereby advantageously increasing space utilization inside the water purifier and miniaturizing the water purifier.

In addition, the configuration of the purified water flow path and the purified water valve may be omitted, thereby advantageously reducing maintenance costs such as costs of pipe replacement that is periodically performed.

When hot water is discharged and purified water is discharged, a flow path of water flowing to a filter may be formed, and thus a discharged water flow rate of purified water may be advantageously ensured while satisfying a temperature condition of hot water.

When purified water is discharged after hot water is discharged, residual water may be discharged after hot water is discharged to prevent the temperature of discharged purified water from being increased by residual hot water, thereby advantageously maintaining the state in which a temperature condition of the discharged purified water is satisfied.

When purified water is discharged after hot water is discharged, the temperature of water discharged may be lowered by cold water to prevent the temperature of discharged purified water from being increased by residual hot water, thereby advantageously maintaining the state in which a temperature condition of the discharged purified water is satisfied.

By heating water flowing toward the filter and then supplying the heated water toward the filter, the water discharge nozzle as well as the pipe and the valve that are disposed between the filter and the water discharge nozzle based on a flow direction of water may also be advantageously sterilized with hot water.

Because hot water sterilization proceeds while water is continuously discharged, foreign substances may be advantageously removed simultaneously while the flow path and the valve are sterilized by flow velocity.

Some of hot water generated while a flow path and a valve included in the water purifier are washed with hot water and is washed with hot water may be discharged to the water discharge nozzle, and the residual water may be drained out of the water purifier, and thus it may be possible to prevent a safety accident such as burns that may occur when a large amount of hot water is discharged to the water discharge nozzle, and there may also be an advantage in that a user avoids hassle to process a large amount of hot water.

A separate accommodation groove and accommodation groove cover may be formed on the water purifier body, and thus the sterilization water module may be easily checked and replaced, and the sterilization water module may be separated and installed without separating the water purifier body, thereby advantageously improving workability.

The sterilization water module may be disposed in an empty space inside the water purifier body, thereby advantageously increasing space utilization.

The upper blade part and the lower blade part may be separately formed on the shaft part of the stirring member installed in the cold water module, and upper flow and lower flow may each occur, and thus, through rotation of the upper blade part, separate flow may occur in an upper space in which an evaporator is disposed, thereby advantageously lowering the overall water temperature in the coolant tank. In addition, through rotation of the lower blade part, separate flow may occur in a lower space in which the cold water flow path is disposed, and heat exchange may be performed faster and more reliably, thereby advantageously lowering cold water discharging temperature.

Without separation of the top cover, the wires may be connected to the body part through the rear surface of the housing, thereby advantageously improving workability. In the state in which the housing is assembled, the wires may be connected to the rear surface of the housing, thereby advantageously improving assembly.

The corrugated section may be formed in at least some of various pipes, and a direction in which the pipe extends may be advantageously changed easily.

The corrugated sections may be formed at various points of the pipe, and a shape of the pipe may be easily deformed according to an environment in which the body part is installed.

What is claimed is:

1. A water purifier comprising:
a body part configured to generate purified water, hot water, and sterilization water; and
a water outlet disposed at an outside of the body part, configured to discharge the purified water, the hot water, and the sterilization water generated by the body part, and including a water discharge nozzle,
wherein the body part includes:
a housing defining a storage space,
a filter provided inside the housing and configured to purify water supplied from an external water supply source,
a hot water module that defines a heating flow path through which the purified water passing through the filter passes and that is configured to heat the purified water passing through the heating flow path into hot water,
an intermediate flow path connecting the filter to the hot water module,
a sterilization water flow path having a first side branched from the intermediate flow path and a second side connected to the water outlet,
a sterilization water module installed in the sterilization water flow path and configured to electrolyze water passing through the sterilization water flow path into sterilization water,
a hot water flow path configured to guide the hot water or purified water passing through the hot water module toward the water discharge nozzle, and a controller configured to control an operation of the hot water module and the sterilization water module,
wherein the controller is configured to, based on the purified water being discharged, turn off the hot water module, and the purified water discharged from the hot water module is discharged to the water outlet through the hot water flow path, and
wherein the controller is configured to, based on the hot water being discharged, turn on the hot water module, and the hot water discharged from the hot water module is discharged to the water outlet through the hot water flow path.

2. The water purifier of claim 1, wherein:
the body part defines an accommodation groove concave inwardly from an upper part of a first side of the body part,
the sterilization water module is accommodated in the accommodation groove, and
an accommodation groove cover configured to shield an open entrance of the accommodation groove is detachably coupled to the body part.

3. The water purifier of claim 2, wherein:
the body part defines an upper surface part extending inwardly from an upper end of the open entrance of the accommodation groove, and
the accommodation groove cover includes (i) an upper end part extending in a horizontal direction from the upper end of the open entrance of the accommodation groove and contacting the upper surface part and (ii) a hook part provided at an end of the upper end part and coupled to an end of the upper surface part in a hook manner.

4. The water purifier of claim 2, wherein:
the body part defines a lower surface part extending inwardly from a lower end of the body part defining the open entrance of the accommodation groove, and
the accommodation groove cover defines a lower end part extending in a horizontal direction from the lower end and contacting an upper end of the lower surface part.

5. The water purifier of claim 1, further comprising:
a cold water flow path having a first side branched from the intermediate flow path and a second side connected to the water outlet; and
a cold water module installed in the cold water flow path and configured to cool purified water passing through the cold water flow path into cold water.

6. The water purifier of claim 5, wherein the cold water module includes:
a coolant tank configured to receive a coolant,
a tank cover configured to cover an opening at an upper surface of the coolant tank,
a stirring motor installed in the tank cover, and
a stirring member placed inside the cold water flow path and including (i) a shaft part that is inserted into the body part and that is connected to a rotating shaft of the stirring motor and (ii) a blade part provided at each of a middle and a lower end of the shaft part.

7. The water purifier of claim 6, wherein the blade part includes a plurality of blades inclined to a first side of the stirring member and arranged along a periphery of the shaft part.

8. The water purifier of claim 7, wherein the blade part includes (i) an upper blade part provided at the middle of the shaft part and (ii) a lower blade part provided at the lower end of the shaft part.

9. The water purifier of claim 8, wherein a blade of the upper blade part is inclined by a first angle, and a blade of the lower blade part is inclined by a second angle less than the first angle with respect to a vertical direction of the shaft part.

10. The water purifier of claim 1, wherein:

the housing includes a connector having an opening at an upper side and connecting an inside and an outside of the housing, and the connector includes (i) a first connector having a first height and (ii) a second connector having a second height less than the first height and connected to a first side of the first connector.

11. The water purifier of claim 10, further comprising:

a connector cover inserted through the first connector and configured to shield the second connector, wherein the connector cover defines a slide groove into which an upper end and a lower end of the second connector are inserted at an upper side and a lower side, respectively, and wherein the connector cover is slidably coupled to the second connector.

12. The water purifier of claim 11, wherein the connector cover defines at least one through hole through which a pipe or an electric wire passes.

13. The water purifier of claim 11, wherein the connector cover is made of an elastic material.

14. The water purifier of claim 1, wherein:

the housing includes (i) a connector having an opening an upper side and connecting an inside and an outside of the housing and (ii) a pipe extending toward the outside of the housing from the inside of the housing through the connector.

15. The water purifier of claim 14, wherein:

the pipe includes a plurality of corrugated sections along a longitudinal direction, and the plurality of corrugated sections are spaced apart from each other and provided at a plurality of positions.

16. The water purifier of claim 1, further comprising:

a hot and cold water valve mounted between the filter and the hot water module and configured to control flow of water flowing toward the hot water module, wherein the controller is configured to, based on the hot water and the purified water being discharged, open the hot and cold water valve to guide water toward the hot water module.

17. The water purifier of claim 1, further comprising:

a water supply flow path configured to guide water supplied from the external water supply source toward the filter;

an auxiliary flow path that is branched from a first point of the water supply flow path and combined with a second point of the water supply flow path, the second point positioned behind the first point with respect to a flow direction of water;

a flow control valve installed in the auxiliary flow path; and a flow switching valve installed at the first point and configured to control flow of water flowing toward the auxiliary flow path in the water supply flow path, wherein the controller is configured to control an operation of the flow switching valve.

18. The water purifier of claim 17, further comprising:

an auxiliary heater installed in the auxiliary flow path and configured to heat water flowing in the auxiliary flow path, wherein the controller is configured to, based on the hot water being sterilized, operate the auxiliary heater, and hot water heated while passing through the auxiliary heater passes through the filter and flows in a direction toward the water discharge nozzle.

* * * * *